US008835862B2

(12) United States Patent
Tajima

(10) Patent No.: US 8,835,862 B2
(45) Date of Patent: Sep. 16, 2014

(54) RADIATION IMAGE PHOTOGRAPHING APPARATUS

(75) Inventor: Hideaki Tajima, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 254 days.

(21) Appl. No.: 13/283,108

(22) Filed: Oct. 27, 2011

(65) Prior Publication Data

US 2012/0112081 A1  May 10, 2012

(30) Foreign Application Priority Data

Nov. 4, 2010 (JP) ................................. 2010-246987

(51) Int. Cl.
*G01T 1/17* (2006.01)
*H04N 5/378* (2011.01)
*H04N 5/32* (2006.01)

(52) U.S. Cl.
CPC *H04N 5/378* (2013.01); *G01T 1/17* (2013.01); *H04N 5/32* (2013.01)
USPC .................................................. 250/370.09

(58) Field of Classification Search
CPC ......................................................... G01T 1/17
USPC ........................... 250/370.09, 370.11, 370.14
See application file for complete search history.

(56) References Cited

U.S. PATENT DOCUMENTS 5,596,200 A * 1/1997 Sharma et al. ............ 250/370.14
6,437,338 B1 * 8/2002 Hoffman ................... 250/370.09

FOREIGN PATENT DOCUMENTS

| JP | 6-342099 A | | 12/1994 |
| JP | 9-73144 A | | 3/1997 |
| JP | 2006-58124 A | | 3/2006 |
| JP | 2009-219538 A | | 10/2009 |
| JP | 2010-217141 A | | 9/2010 |
| JP | 2010213917 A | * | 9/2010 |

OTHER PUBLICATIONS

Written Notice of Rejection for Japanese Patent Application No. 2010-246987, drafted Feb. 26, 2014, with English translation.

* cited by examiner

*Primary Examiner* — Casey Bryant
(74) *Attorney, Agent, or Firm* — Cantor Colburn LLP

(57) ABSTRACT

A radiation image photographing apparatus is provided with a bias source to apply a bias voltage via bias lines to radiation detecting elements arranged in a two dimensional form in regions divided by scanning lines and signal lines. The bias lines are connected to the radiation detecting elements with a ratio of one bias line to the radiation detecting elements arranged on one column in an extension direction of the signal line, and the bias lines are connected per a predetermined number of bias lines to either one of a plurality of connection lines. The bias voltage is applied from the bias source to the connection lines via the bias lines so that the bias voltage is applied to the radiation detecting elements via the bias lines connected to the connection lines.

6 Claims, 21 Drawing Sheets

RADIATION IMAGE PHOTOGRAPHING APPARATUS

This application is based on Japanese Patent Application No. 2010-246987 filed on Nov. 4, 2010 in Japanese Patent Office, the entire content of which is hereby incorporated by reference.

BACKGROUND OF THE INVENTION

The present invention relates to a radiation image photographing apparatus, and particularly relates to a radiation image photographing apparatus constituted so as to apply bias voltage to radiation detecting elements.

Various types of radiation image photographing apparatuses are developed, such as so-called direct type radiation image photographing apparatuses that generate charge by detecting elements in accordance with the dose of radiation, such as irradiated X rays and converts the charge into electric signals, and so-called indirect type radiation image photographing apparatus that converts irradiated radiation into electromagnetic waves with other wave length, such as visible light by scintillator and the like, then generates charge corresponding to the energy of the converted and irradiated electromagnetic waves by photoelectric converting elements, such as photo-diodes, and converts the charge into electric signals (i.e., image data).

These types of radiation image photographing apparatus are known as FPD (Flat Panel Detector). Conventionally, such the radiation image photographing apparatus are formed integrally with a support base (or bucky apparatus) (for example, refer to Patent Document 1). However, in recent years, the radiation detecting elements and the like are accommodated in a housing, so that portable type radiation image photographing apparatuses capable of being carried with portability are developed and put in practical use (for example, refer to Patent Documents 2 and 3).

In such radiation image photographing apparatuses, for example, as shows in FIG. 4 and FIG. 8 which are mentioned later, usually, radiation detecting elements 7 are disposed respectively in small regions divided by a plurality of scanning lines 5 and a plurality of signal lines 6 which are disposed to cross each other on a base plate 4, and a plurality of radiation detecting elements 7 is arranged in a two dimensional form (a matrix form) so that a detecting section P is formed.

Moreover, switch sections constituted with thin film transistors (hereafter, merely referred to as TFTs) 8 are connected to the respective radiation detecting elements 7, and further bias lines 9 to apply a bias voltage are connected to the respective radiation detecting elements 7. Moreover, the respective scanning lines 5 are connected to gate drivers 15b of a scan driving section 15, and the respective signal lines are connected to a read-out circuit 17 in a read-out IC 16.

At the time of radiation image photography, radiation is irradiated to the radiation image photographing apparatus on the condition that the respective TFTs 8 are turned to OFF state with the application of OFF voltage from the gate driver 15b to all of the scanning lines 5. Then, charges generated in the respective radiation detecting elements 7 upon irradiation with radiation are accumulated in the respective radiation detecting elements 7.

After the irradiation of radiation, when ON voltage is applied sequentially from the gate driver 15b to the respective scanning lines 5, the charges accumulated in the respective radiation detecting elements 7 are discharged to the signal lines 6 via the TFTs 8 turned to ON state, the charges are converted into electric signals, i.e., image data by the read-out circuit, and the image data are read out.

Patent document 1: Japanese Unexamined Patent Publication No. H9-73144 official report
Patent document 2: Japanese Unexamined Patent Publication No. 2006-058124 official report
Patent document 3: Japanese Unexamined Patent Publication No. H6-342099 official report Incidentally, according to investigation by the present inventors, for example, as shown in FIG. 22A, when radiation is irradiated to a radiation image photographing apparatus 1 having the above-mentioned structure on the condition that the irradiation field is limited to a small region, on the portions other than the portion A irradiated with radiation, the values of the image data read out from the respective radiation detecting elements 7 are expected to become small uniformly.

However, it turns out that actually, there may be a case where, as shown in FIG. 22B, a phenomenon that the image data D of the portion B of the respective radiation detecting elements 7 connected to the same scanning line with the respective radiation detecting elements 7 on the portion A irradiated with radiation becomes smaller than the image data D of the respective radiation detecting elements 7 on the other portion C, i.e., a phenomenon that cross talk occurs in the elongated direction of the scanning lines 5 (that is, in the traverse direction in the figure, hereafter, referred to as the scanning line direction), may appear.

In this case, when image data D are checked in the arrowed mark direction (in this case, in the elongated direction of the signal lines 6) shown in FIG. 22B, for example, as shown in FIG. 23, the image data D of the portion B of the respective radiation detecting elements 7 connected to the same scanning line with the respective radiation detecting elements 7 on the portion A irradiated with radiation becomes smaller wholly than the image data D of the respective radiation detecting elements 7 on the other portion C.

Further, reversely, as shown in FIG. 24A, when a shielding plate is placed on a part of the radiation image photographing apparatus F and radiation being not so strong is irradiated uniformly all over the apparatus F, on the portions other than the portion α where the shielding plate was placed, the values of the image data D read out from the respective radiation detecting elements 7 are expected to be the uniform value. However, actually, there may be a case where, as shown in FIG. 24B, a phenomenon that the image data D of the portion β of the respective radiation detecting elements 7 connected to the same scanning lines with the respective radiation detecting elements 7 on the portion α where the shielding plate was placed, become larger than the image data D of the respective radiation detecting elements 7 on the other portions γ, (that is a phenomenon that cross talk occurs in the elongated direction of the scanning lines), may appear.

If such cross talk occurs, for example, in the case where diseased parts of a patient are photographed with the radiation image photographing apparatus F used in radiation image photography for medical service, cross talk as shown in FIG. 22B occurs in the scanning line direction on the portion (i.e., so-called "direct pass-through portions") of the radiation image photographing apparatus F to where radiation is irradiated directly without passing through a body of a patient being an object to be photographed, or cross talk as shown in FIG. 24B occurs on the portion of the radiation image photographing apparatus F at where an amount of radiation having arrived to the radiation image photographing apparatus 1 is small due to absorption into the body or scattering by the body when radiation passes through the body of a patient.

Therefore, when a radiation image is produced based on the read-out image data, various influences of cross talk appear on the radiation image, so that the radiation image is not likely to be observed easily.

Accordingly, if influences of cross talk appear on the radiation image, there is fear that the portions of cross talk are erroneously observed as diseased parts, or diseased parts are overlooked due to difficulty in observation for the diseased parts under the influence of cross talk.

SUMMARY OF THE INVENTION

The present invention is achieved in view of the above problems, and an object of the present invention is to provide a radiation image photographing apparatus which can prevent adequately cross talk from occurring in the scanning line direction.

In order to solve the above problems, a radiation image photographing apparatus of the present invention is equipped with:

a detecting section including a plurality of scanning lines and a plurality of signal lines which are arranged to cross each other, and a plurality of radiation detecting elements which are arranged in a two dimensional form in respective regions divided by the plurality of scanning lines and the plurality of signal lines;

a bias source which applies a bias voltage onto the radiation detecting elements;

a scan driving section to switch over between ON voltage and OFF voltage on the scanning lines so as to switch over between ON voltage and OFF voltage to be applied to respective switch sections of the radiation detecting elements;

a read-out circuit to read out image data by converting charge discharged from the radiation detecting elements to the signal lines via the switch sections into the image data; and a control section to control at least the scan driving section and the read-out circuit so as to conduct read-out processing of the image data;

wherein the bias lines are connected to the radiation detecting elements arranged in the detecting section with a ratio of one bias line to the radiation detecting elements arranged on one column in an extension direction of the signal line, and the bias lines are separated into a plurality of groups each of which includes a predetermined number of bias lines and one of the plurality of groups is connected to either one of a plurality of connection lines, and wherein the bias voltage is applied from the bias source to the connection lines via the bias lines so that the bias voltage is applied to the radiation detecting elements via the bias lines connected to the connection lines.

Moreover, a radiation image photographing apparatus of the present invention is equipped with:

a detecting section including a plurality of scanning lines and a plurality of signal lines which are arranged to cross each other, and a plurality of radiation detecting elements which are arranged in a two dimensional form in respective regions divided by the plurality of scanning lines and the plurality of signal lines;

a bias source which applies a bias voltage onto the radiation detecting elements;

a scan driving section to switch over between ON voltage and OFF voltage on the scanning lines so as to switch over between ON voltage and OFF voltage to be applied to respective switch sections of the radiation detecting elements;

a read-out circuit to read out image data by converting charge discharged from the radiation detecting elements to the signal lines via the switch sections into the image data; and a control section to control at least the scan driving section and the read-out circuit so as to conduct read-out processing of the image data;

wherein the bias lines are connected to the radiation detecting element arranged on the detecting section such that the radiation detecting element arranged on one raw in an extension direction of the scanning line are divided into multi divisions, and one bias line the bias lines is connected to the radiation detecting element located in one of the multi divisions, and wherein the bias voltage is applied from the bias source to the bias lines so that the bias voltage is applied to the radiation detecting elements via the bias lines.

According to the radiation image photographing apparatus 1 of a type of this embodiment, the respective bias lines arranged in the signal line direction are connected for each of the predetermined number of lines to either one of a plurality of connection lines (refer to FIG. 18), or the respective bias lines elongated in the scanning line direction are divided into multi divisions in the scanning line direction (refer to FIG. 21), and then the bias voltage is applied from the bias source to the respective radiation detecting elements via the respective connection lines or the respective bias lines.

Therefore, the resistance value of the respective connection lines elongated in the scanning line direction or the respective bias lines becomes small, and further, an amount of holes which flow into the respective connection lines or the respective bias lines becomes small. Then, since the bias voltage which rises once returns adequately to the original bias voltage before the voltage applied to the scanning line is switched from ON voltage to OFF voltage. Accordingly, cross talk in the scanning line direction can be prevented adequately from occurring.

Consequently, for example, in the case where diseased parts of a patient are photographed with the radiation image photographing apparatus 1 used in radiation image photography for medical service, cross talk as shown in FIG. 22B and FIG. 24B tends to occur in the scanning line direction on the portion (i.e., so-called "direct pass-through portions") of the radiation image photographing apparatus to where radiation is irradiated directly without passing through a body of a patient being an object to be photographed, or on the portion of the radiation image photographing apparatus at where an amount of radiation having arrived to the radiation image photographing apparatus is small due to absorption into the body or scattering by the body when radiation passes through the body of a patient.

However, in such a case, in the radiation image photographing apparatus 1 relating to the this embodiment, since the occurrence of cross talk in the scanning direction can be prevented adequately, the influence of cross talk does not appear on a radiation image produced based on the read-out image data so that the radiation image can be observed easily. Accordingly, it becomes possible to prevent adequately the occurrence of the inconvenience that the portions of cross talk are erroneously observed as diseased parts, or diseased parts are overlooked due to difficulty in observation for the diseased parts under the influence of cross talk.

DETAILED DESCRIPTION OF THE PREFERRED EMBODIMENT

Hereafter, embodiments of a radiation image photographing apparatus relating to the present invention will be described with reference to drawings.

In the following description, explanation will be given the case of a so-called indirect type radiation image photographing apparatus in which the radiation image photographing apparatus is equipped with scintillator and the like, converts irradiated radiation into electromagnetic waves with other wavelength, such as visible light, and acquires electric signals. However, the present invention may be also applied to a direct type radiation image photographing apparatus which detects directly radiation with radiation detecting element without employing scintillator and the like.

Further, explanation will be given the case where a radiation image photographing apparatus is a portable type. However, the present invention may be also applied to a radiation image photographing apparatus (i.e., so-called exclusive apparatus) which is formed integrally with a support base.

[With Regard to a Basic Structure of a Radiation Image Photographing Apparatus]

Figure 1:
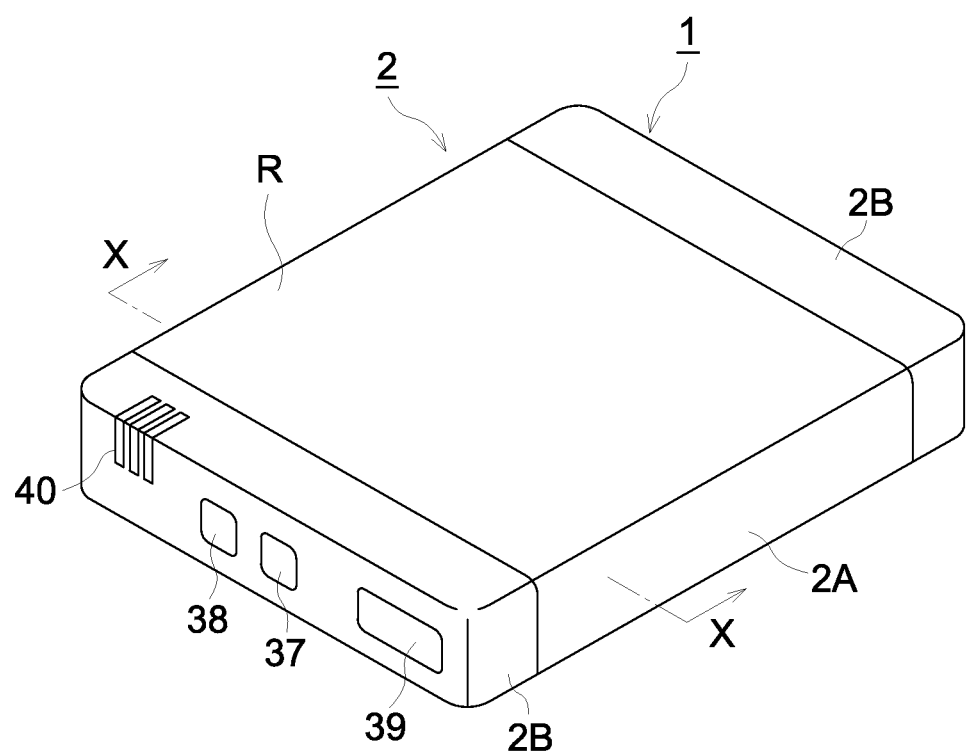
FIG. 1 is an external appearance perspective view of a radiation image photographing apparatus with a basic structure.
Figure 2:
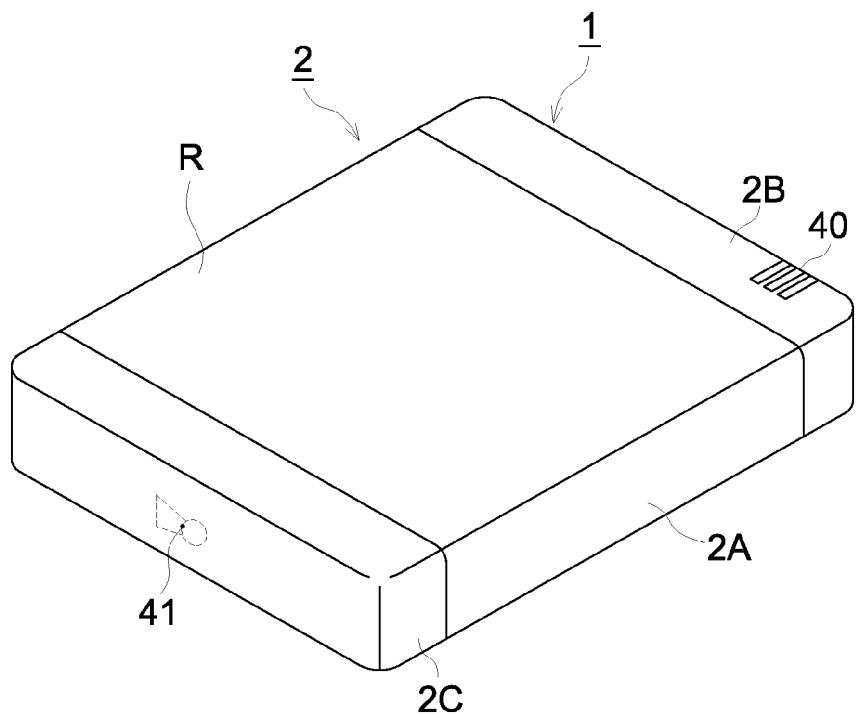
FIG. 2 is an external appearance perspective view of the radiation image photographing apparatus which is looked from the opposite side of FIG. 1.
Figure 3:
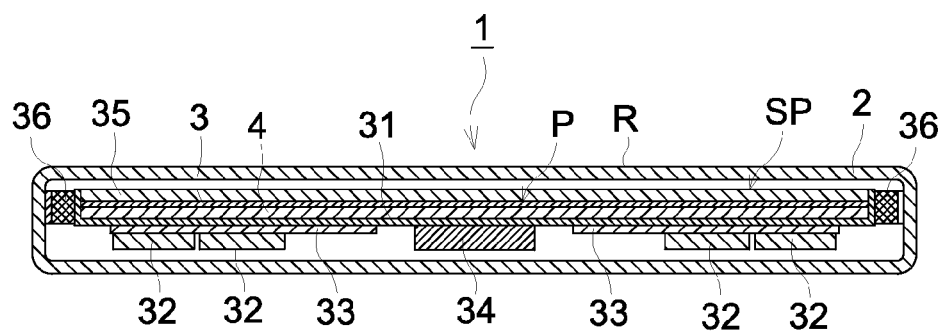
FIG. 3 is a cross sectional view along the X-X line in FIG. 1.

FIG. 1 is an external appearance perspective view of a radiation image photographing apparatus with a basic structure, FIG. 2 is an external appearance perspective view of the radiation image photographing apparatus which is looked from the opposite side of FIG. 1, and FIG. 3 is a cross sectional view along the X-X line in FIG. 1. As shown in FIGS. 1 to 3, in the radiation image photographing apparatus 1, a sensor panel SP constituted with scintillator 3, a base plate 4, and the like is accommodated in a box-like housing 2.

As shown in FIG. 1 and FIG. 2, in this embodiment, in the box 2, a housing body portion 2A which is in the form of a hollow square tube and has a radiation incidence surface R is made of materials such as carbon board and plastic which transmit radiation. Opening portions at the both sides of the housing body portion 2A are closed with cover members 2B and 2C so as to form the box 2. In place of the structure that the box is formed in a monocoque type structure, it may be formed in a lunch box type structure constituted with a front plate and a back plate.

As shown in FIG. 1, on the cover member 2B at one side of the box 2, disposed are a power switch 37, a changeover switch 38, a connector 39, and an indicator 40 constituted with LED to indicate a battery state and operation states of the radiation image photographing apparatus 1.

In this embodiment, the connector 39 is configured to function as a communicating section by being connected with, for example, a cable (not shown) when image data are transmitted to an external device via a cable, and information and signals are exchanged between the radiation image photographing apparatus 1 and an external device. In this regard, the disposing position of the connector 39 is not limited to the cover member 2B, and the connector 39 may be disposed at an appropriate position on the radiation image photographing apparatus 1.

Moreover, as shown in FIG. 2, an antenna unit 41 for exchanging wirelessly information, signals, and like between the radiation image photographing apparatus 1 and the external device is disposed by being embedded in, for example, the cover member 2C at the opposite side of the box 2. In this regard, the disposing position of the antenna unit 41 is not limited to the cover member 2C, and the antenna unit 41 may be disposed at an arbitral position on the radiation image photographing apparatus 1. Further, the number of antenna unit 41 is not limited to one piece, and two or more antenna units 41 may be disposed.

As shown in FIG. 3, in the inside of the box 2, a pedestal 31 is arranged via a thin plate of lead (not shown) at the lower side of the base plate 4, and on the pedestal 31, a PCB base plate 33 on which electronic components 32 are mounted, cushioning members 36, and the like are attached. Further, on the radiation incidence surface R of the base plate 4 and the scintillator 3, a glass substrate 35 for protecting them is disposed. Further, in this embodiment, between the sensor panel SP and the side face of the box 2, the cushioning members 36 for preventing them from colliding is disposed.

The scintillator 3 is disposed at a location opposite to a later-mentioned detecting section P of the base plate 4. The scintillator 3 used in this embodiment is composed of phosphor as main components and, upon receipt of incidence of radiation, converts the radiation into electromagnetic waves with a wavelength of 300 to 800 nm, that is, electromagnetic waves composed of mainly visible light, and outputs the electromagnetic waves.

Figure 4:
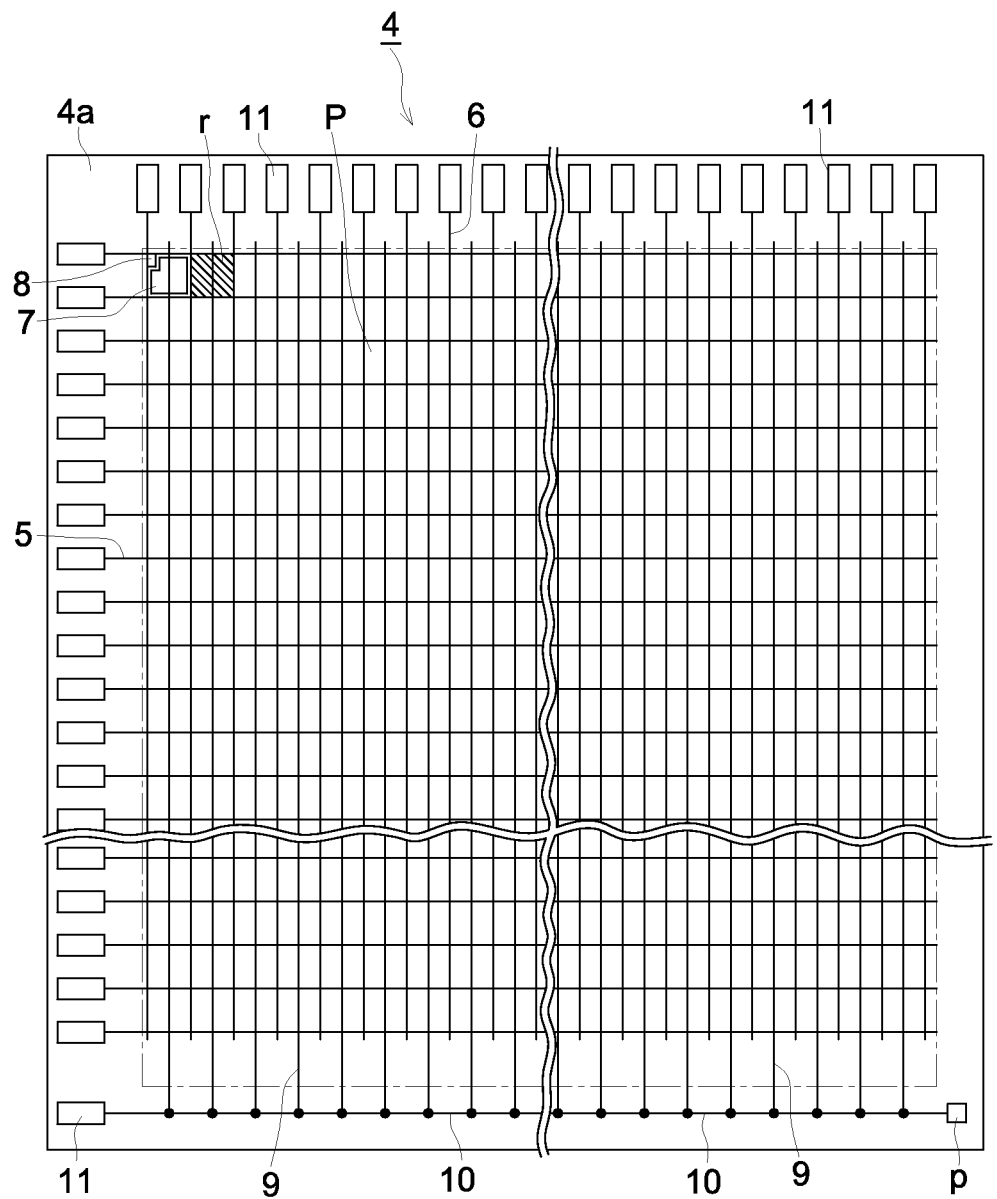
FIG. 4 is a plan view showing a structure of a base plate of the radiation image photographing apparatus.

In this embodiment, the base plate 4 is constituted with a glass substrate, and as shown in FIG. 4, on the surface 4a the base plate 4 at the side opposite to the scintillator 3, a plurality of scanning lines 5 and a plurality of signal lines 6 are arranged so as to cross each other. Radiation detecting elements 7 are disposed respectively in small regions r, divided by the plurality of scanning lines 5 and the plurality of signal lines 6, on the surface 4a the base plate 4.

The entirety of the small regions r in which the plurality of radiation detecting elements 7 are disposed in a two dimensional form on the small regions r divided by the scanning lines 5 and the signal lines 6, that is, the region shown with a one point-dashed line in FIG. 4 is made to the detecting section P. A probe point p shown in FIG. 4 will be described later. Further, the probe point p is not needed to be disposed on an actual apparatus.

In this embodiment, photo-diodes are used as the radiation detecting elements 7. However, as other examples, phototransistors and the like may be usable.

Figure 5:
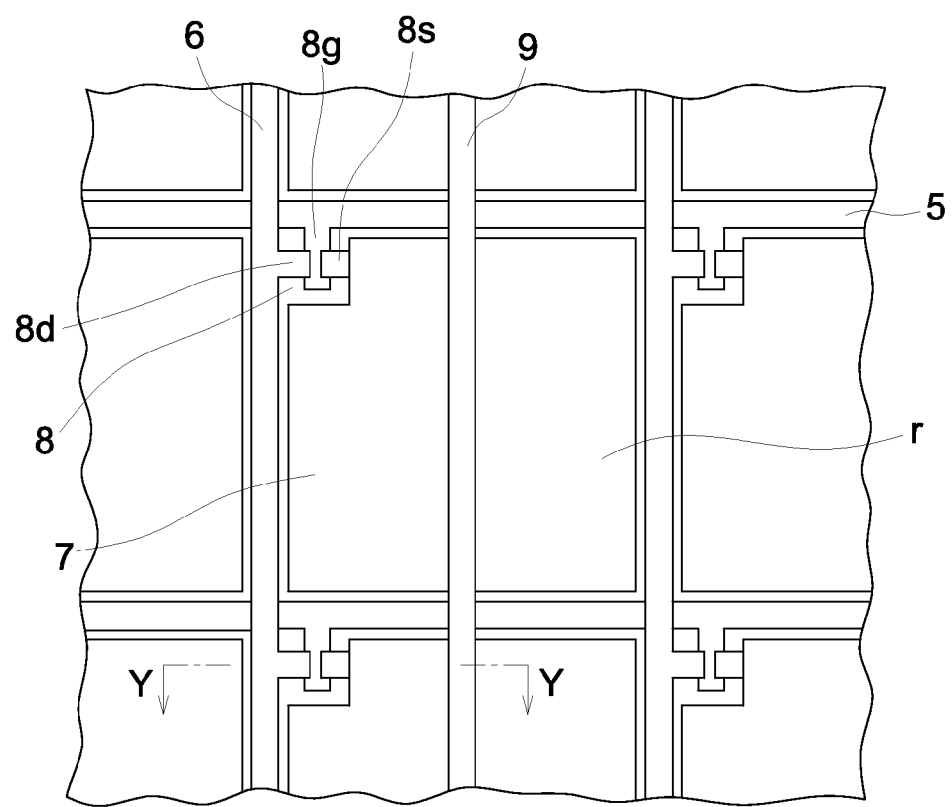
FIG. 5 is an enlarged view showing structures of a radiation detecting element, TFT, and the like formed in a small region on the base plate of FIG. 4.

As shown in FIG. 5 which is an enlarged view of FIG. 4 each radiation detecting elements 7 is connected to a source electrode 8s of TFT 8 which is a switching section. Further, to a drain electrode 8d of the TFT 8, the signal line 6 is connected to.

Upon application of ON voltage onto a gate electrode 8g from the scan driving section 15 via the scanning line 5, the TFT 8 becomes an ON state, and discharges charge accumulated in the radiation detecting elements 7 via the source electrode 8s and the drain electrode 8d to the signal line 6. Subsequently, upon application of OFF voltage onto the gate electrode 8g from the connected scanning line 5, the TFT 8 becomes an OFF state, the TFT 8 becomes an OFF state, and makes the radiation detecting element 7 to accumulate charge therein.

Figure 6:
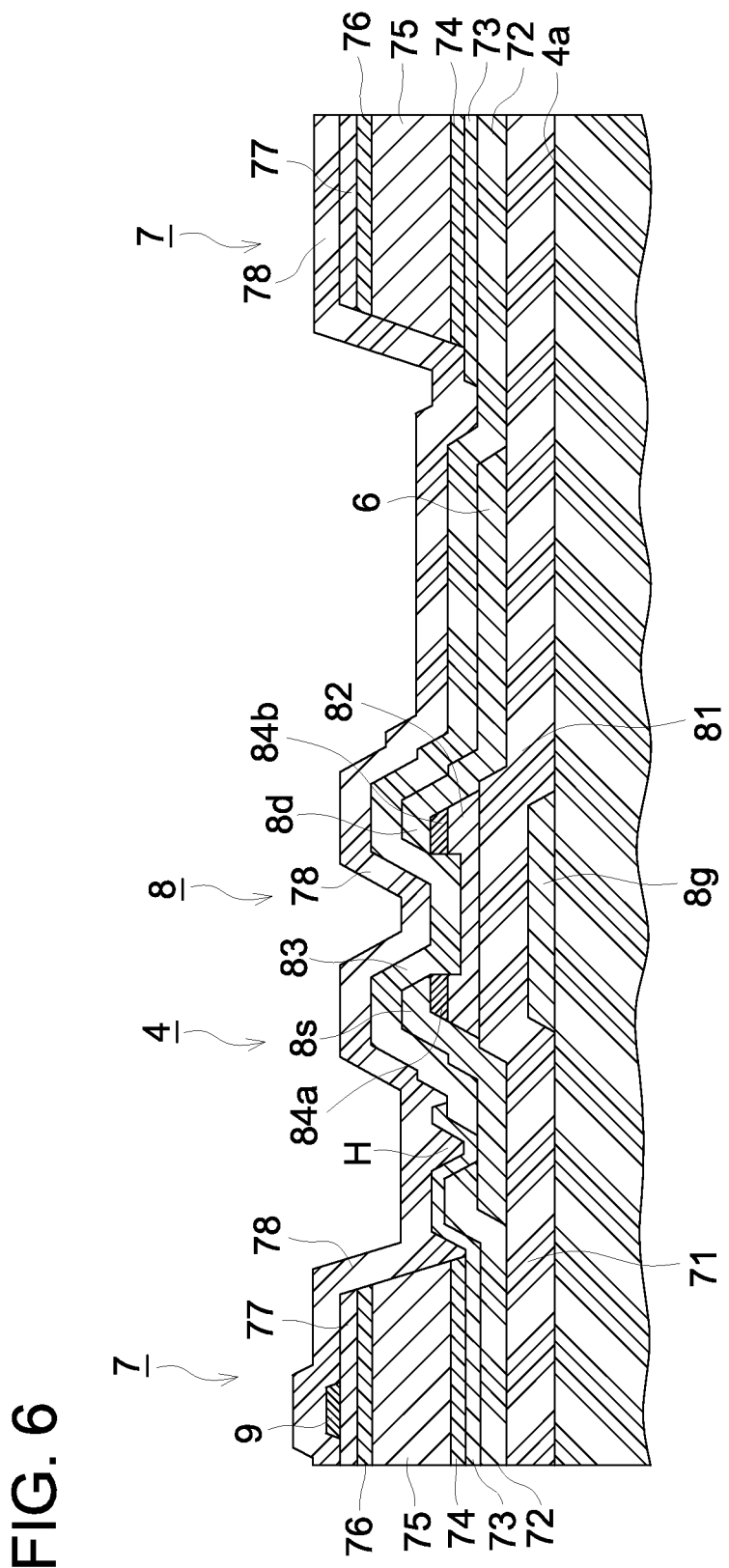
FIG. 6 is a cross sectional view along the Y-Y line in FIG. 5.

Now, the structures of the radiation detecting elements 7 and the TFT 8 in this embodiment will be briefly explained using the cross sectional views shown in FIG. 6. FIG. 6 is a cross sectional view along the Y-Y line in FIG. 5.

On the surface 4a of the base plate 4, the gate electrode 8g of the TFT 8 composed of Al, Cr, and the like is formed by being laminated integrally with the scanning line 5 (not sown), and on the gate electrode 8g and on an upper portion of the gate electrode 8g on the gate insulation layer 81 composed of silicon nitride (SiNx) laminated on the surface 4a, the source electrode 8s connected to the first electrode 73 of the radiation detecting element 7 and the drain electrode 8d to be formed integrally with the signal line 6 are formed by being laminated via a semiconductor layer 82 composed of amorphous silicon hydride (a-Si).

The source electrode 8s and the drain electrode 8d are divided by the first passivation layer composed of silicon nitrides (SiNx) and the like, and further the first passivation layer covers both electrodes 8s and 8d from the upper side. Further, between the semiconductor layer 82 and the source electrode 8s or the drain electrode 8d, ohmic contact layers 84a and 84b formed in n type by doping an amorphous silicon hydride with VI group elements are laminated respectively.

In the portion of the radiation detecting element 7, on the insulation layer 71 formed integrally with the gate insulation layer 81 on the surface 4a of the base plate 4, an insulation layer 72 formed integrally with the above-mentioned first passivation layer 83 is laminated, and on the insulation layer 72, the first electrode 73 composed of Al, Cr, Mo, and the like is laminated. The first electrode 73 is connected to the source electrode 8s of the TFT 8 via a hole H formed on the first passivation layer 83.

On the first electrode 73, a n layer 74 formed in n type by doping amorphous silicon hydride with VI group elements, an i layer 75 being a conversion layer formed with amorphous silicon hydride, and a p layer 76 formed in p type by doping amorphous silicon hydride with III group elements are formed by being laminated from the lower side.

Radiation which enters the radiation incidence surface R of the box 2 of the radiation image photographing apparatus 1 is converted into electromagnetic waves, such as visible light, by scintillator 3. Successively, the converted electromagnetic waves are irradiated from the upper portion in the figure and reach the i layer 75 of the radiation detecting element 7, whereby electron hole pairs are generated in the i layer 75. In this way, the radiation detecting element 7 is configured to convert electromagnetic waves irradiated from the scintillator 3 into charge.

Moreover, on the p layer 76, the second electrode 77 made in a transparent electrode, such as ITO, is formed by being laminated, and is constituted such that irradiated electromagnetic waves reach the i layer 75. In this embodiment, the radiation detecting element 7 is formed as mentioned above. In this regard, the order of the p layer 76, the i layer 75, and the n layer 74 in the lamination layer may be upside down. Moreover, in this embodiment, description is given for the case where as the radiation detecting element 7, a so-call pin type radiation detecting element in which the p layer 76, the i layer 75, and the n layer 74 is laminated in this order is employed, the present invention is not limited to this embodiment.

On the upper surface of the second electrodes 77 of the radiation detecting elements 7, bias lines 9 to apply a bias voltage to the radiation detecting elements 7 via the second electrodes 77 are connected. The second electrodes 77 of the radiation detecting elements 7, the bias lines 9, the first electrodes 73 extended to the TFT 8 side, the first passivation layer 83 of the TFT 8, that is, the upper surface portions the radiation detecting elements 7 and the TFT 8 are covered with a second passivation layer 78 composed of silicon nitrides (SiNx) and the like from the upper side.

In this embodiment, as shown in FIG. 5, a single line of the bias lines 9 is connected to a plurality of radiation detecting elements 7 arranged in the form of a column, respectively, and as shown in FIG. 4 and FIG. 5, the respective bias lines 9 are arranged in parallel to the signal lines 6, respectively. Further, the respective bias lines 9 are bound together to the connection line 10 at the position of the outside of the detecting section P of the base plate 4.

Figure 8:
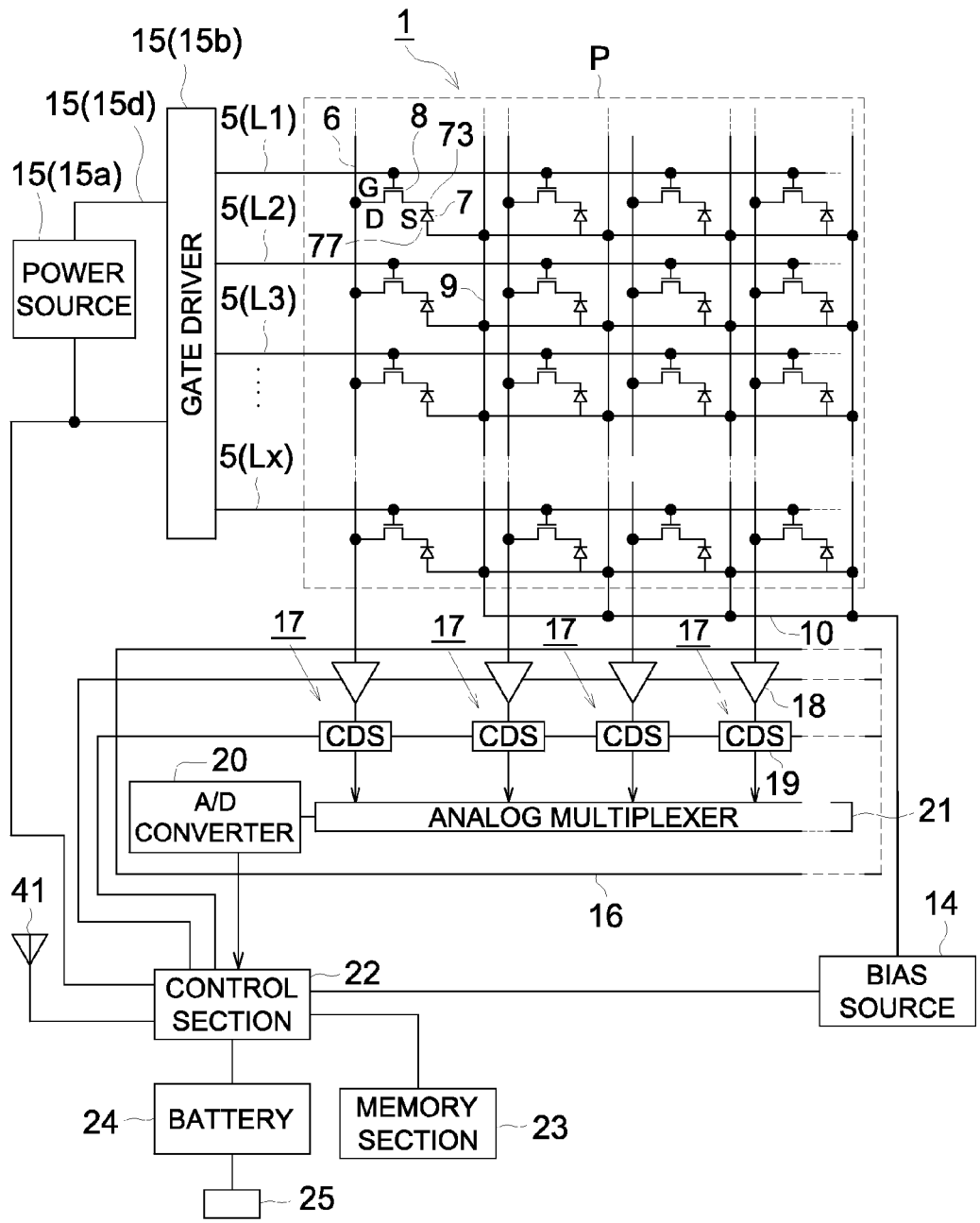
FIG. 8 is a block diagram showing an equivalent circuit of the radiation image photographing apparatus.
Figure 18:
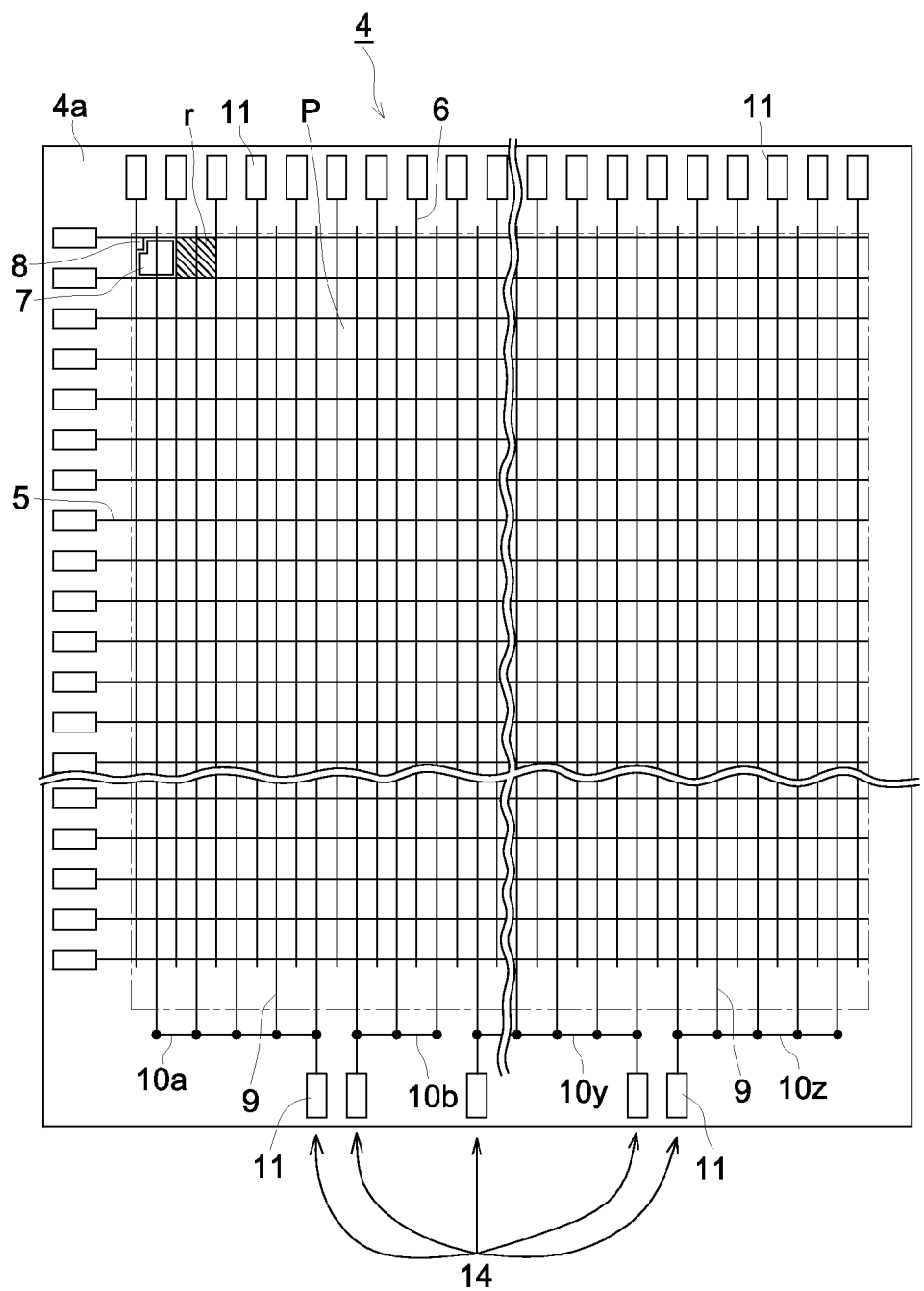
FIG. 18 is a plan view showing a structure of a base plate of a radiation image photographing apparatus in this embodiment in which a predetermined number of bias lines is connected to each of a plurality of divided connection lines.

FIG. 4 and the FIG. 8 show the case where the respective bias lines 9 are bound together to a single line of the connection line 10. This case is merely used for explaining the basic structure. Namely, in this embodiment, as shown in FIG. 18 mentioned later, the connection line 10 is divided into a plurality of portions, and the respective bias lines 9 are connected per a predetermined number of bias lines to either one of a plurality of connection lines 10a, 10b, . . . , 10z, that is, a predetermined number of bias lines 9 is connected to each of the plurality of connection lines. This point will be explained later.

Figure 7:
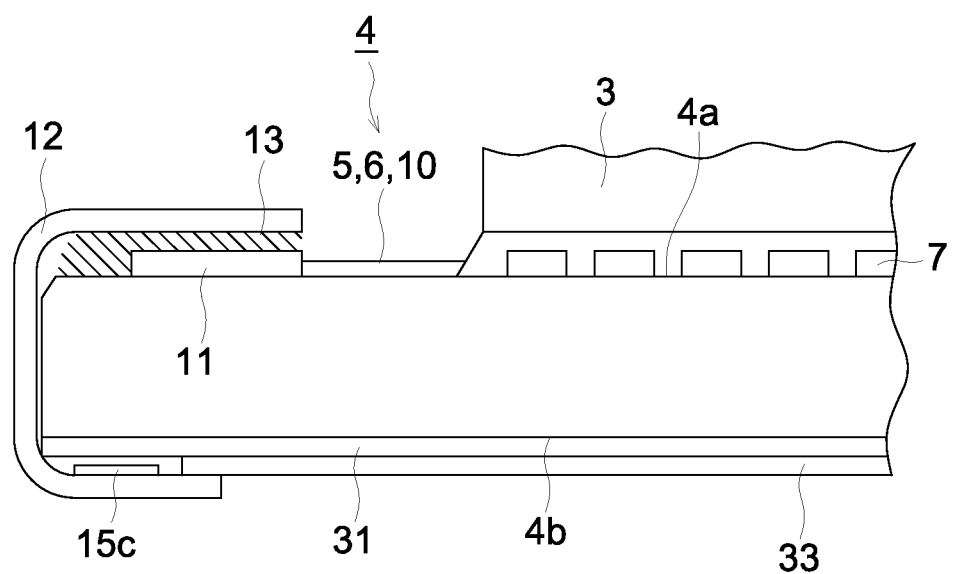
FIG. 7 is a side view for explaining the base plate on which a flexible circuit board, a PCB base plate, and the like are mounted.

In this embodiment, as shown in FIG. 4, the respective scanning lines 5, the respective signal lines 6, and the connection line 10 of the bias lines 9 are connected to an input/output terminal (also referred to as a pad.) 11 disposed near the end portions of the base plate 4, respectively. To the respective input/output terminals 11, as shown in FIG. 7, a flexible circuit board (also referred to as Chip On Film) 12, in which IC chips, such as a gate IC 15c constituting a gate driver 15b of the scan driving section 15 mentioned later is incorporated on a film, is connected via an anisotropy electrically-conductive adhesive film (Anisotropic Conductive Film) 12, and anisotropy electrically-conductive paste (Anisotropic Conductive Paste) 13, and the like.

Moreover, the flexible circuit board 12 is extended to the reverse surface 4b side of the base plate 4, and is connected to the above-mentioned PCB base plate 33 on the reverse surface 4b side. In this way, the sensor panel SP of the radiation image photographing apparatus 1 is formed. In FIG. 7, illustration of the electronic components 32 is omitted.

Now, the circuit structure of the radiation image photographing apparatus 1 will be explained. FIG. 8 is a block diagram showing an equivalent circuit of the radiation image photographing apparatus, and FIG. 9 is a block diagram showing an equivalent circuit per one pixel which constitutes a detecting section.

As mentioned above, to the second electrodes 77 of the respective radiation detecting elements 7 of the detecting section P of the base plate 4, the bias lines 9 are connected, respectively, and the respective bias lines 9 are bound together to the connection line 10, and are connected to the bias power source 14. The bias power source 14 is configured to apply a bias voltage to the second electrodes 77 of the respective radiation detecting elements 7 via the connection line 10 and the respective bias lines 9, respectively.

Moreover, the bias power source 14 is connected to the control unit 22 mentioned later, and is enabled to change the bias voltage to be applied from the bias power source 14 to the respective radiation detecting elements 7.

Figure 9:
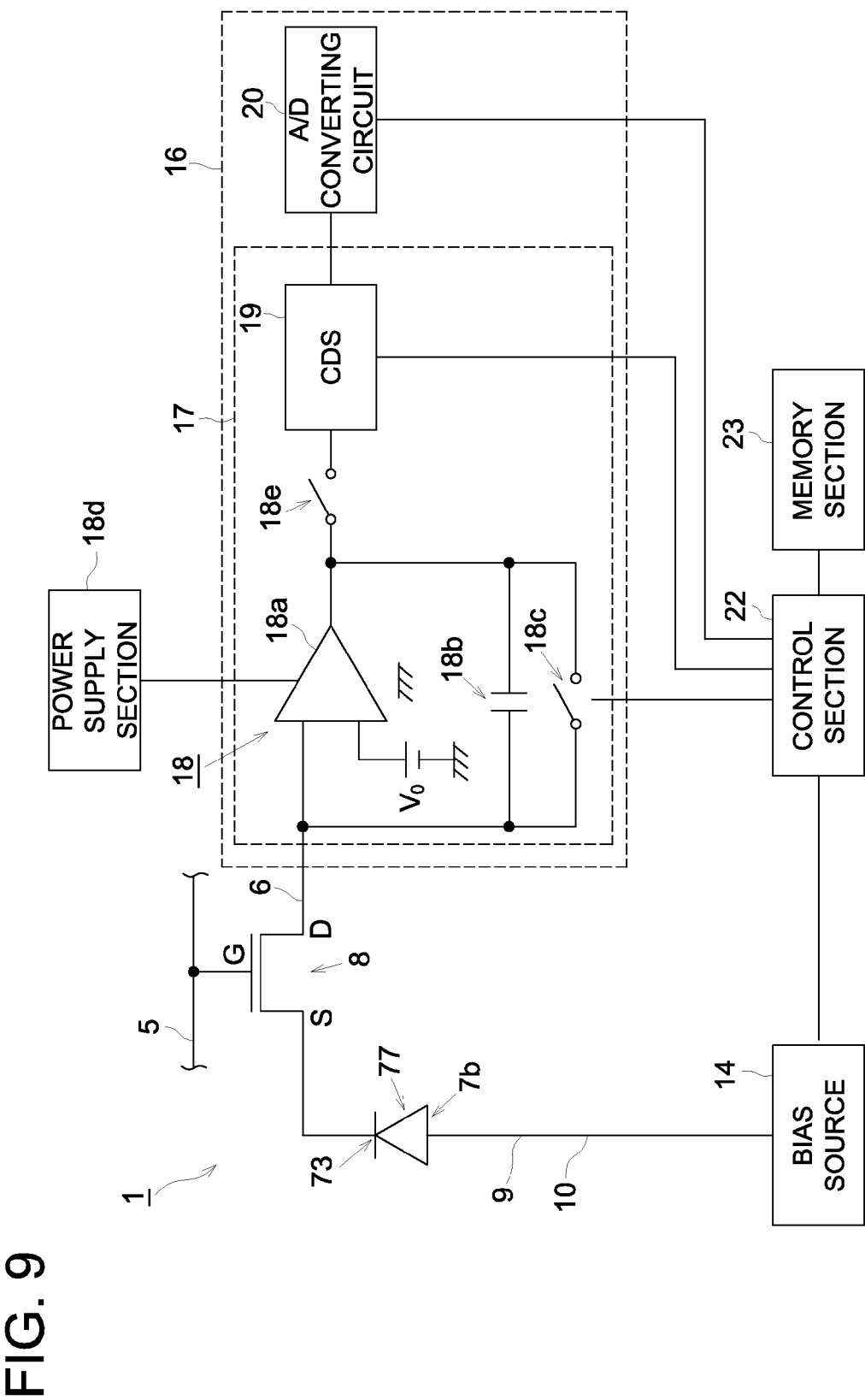
FIG. 9 is a block diagram showing an equivalent circuit per one pixel which constitutes a detecting section.

As shown in FIG. 8 and FIG. 9, in this embodiment, as a bias voltage applied from the bias power source 14 to the second electrodes 77 of the radiation detecting elements 7, for example, a voltage of −5 [V] (i.e., so-called reverse bias voltage) equal to or less than a voltage applied to the first electrode 73 side of the radiation detecting elements 7.

The first electrodes 73 of the respective radiation detecting elements 7 are connected to the source electrodes 8s (represented with "S" in FIG. 8 and FIG. 9) of the TFT 8, and the gate electrodes 8g (represented with "G" in FIG. 8 and FIG. 9) of the respective TFTs 8 are connected to respective lines L1 to Lx of the scanning line 5 elongated from the gate driver 15b of a scan driving unit 15 mentioned later, respectively. Moreover, the drain electrodes 8d (represented with "D" in FIG. 8 and FIG. 9) of the respective TFTs 8 are connected to the respective signal lines 6, respectively.

The scan driving unit 15 is equipped with a power supply circuit 15a which supplies ON voltage and OFF voltage to the gate driver 15b via wiring 15d, the gate driver 15b which switches between ON state and OFF state of the respective TFTs 8 by switching over a voltage applied to the respective lines L1 to Lx of the scanning line 5 between ON voltage and OFF voltage.

Moreover, upon application of ON voltage onto the gate electrode 8g from the gate driver 15b of the scan driving section 15 via the scanning line 5, the TFT 8 being a switching section makes the radiation detecting elements 7 to discharge charge accumulated therein to the signal lines 6, and upon application of OFF voltage onto the gate electrode 8g, the TFT 8 stops discharging of charge from the radiation detecting elements 7 and makes the radiation detecting elements 7 to accumulate generated charge therein.

As shown in FIG. 8 or FIG. 9, the respective signal lines 6 are connected to the read-out circuit 17 formed in the read-out IC 16, and in this embodiment, two or more read-out ICs 16 are disposed side by side, and the respective signal lines 6 are expected to be connected to either of the two or more read-out ICs 16.

The read-out circuit 17 is constituted by an operational amplifier 18a; a capacitor 18b and a charge reset switch 18c which are connected respectively in parallel to the operational amplifier 18a; an amplification circuit 18 composed of a charge amplifier circuit to which electric power is supplied from a power supply section 18d; and a correlation double sampling circuit 19. Further, between the operational amplifier 18a and the correlation double sampling circuit 19, provided is a switch 18e which performs ON and OFF actions of the charge reset switch 18c on a interlocking mode with ON and OFF actions of the charge reset switch 18c.

In the read-out IC 16, further, an analog multiplexer 21 and an A/D converter 20 are provided. In FIG. 8 and FIG. 9, the correlation double sampling circuit 19 is represented with CDS. Further, in FIG. 9, the analog multiplexer 21 is omitted.

The signal lines 6 are connected to inversed input terminals at the input side of the operational amplifier 18a of the amplification circuit 18, and a reference potential $V_0$ is applied to non-inversed input terminals at the input side of the amplification circuit 18. In this connection, the reference potential $V_0$ is set to a proper value. Hereafter, explanation will be given the case where 0 [V] is applied as the reference potential $V_0$. However, a positive electric potential or a negative electric potential other than 0 [V] may be set as the reference potential $V_0$.

Further, it is constituted that this reference potential $V_0$ is be applied to the respective signal lines 6 and the drain electrodes 8d of the respective TFTs 8 via the operational amplifier 18a. Therefore, in this embodiment, basically, the electric potential of the drain electrodes 8d of the respective TFTs 8 has become this reference potential $V_0$, that is, 0 [V] (or an electric potential with the value set up as mentioned above), i.e., 0 [V].

In this embodiment, in the amplification circuit 18, on the condition that the charge reset switch 18c is turned off, the voltage value corresponding to the amount of charge accumulated in the capacitor 18b is output from the output side of the operational amplifier 18a. However, it may be constituted that electric current is output in accordance with the amount of accumulated charge.

Figure 10:
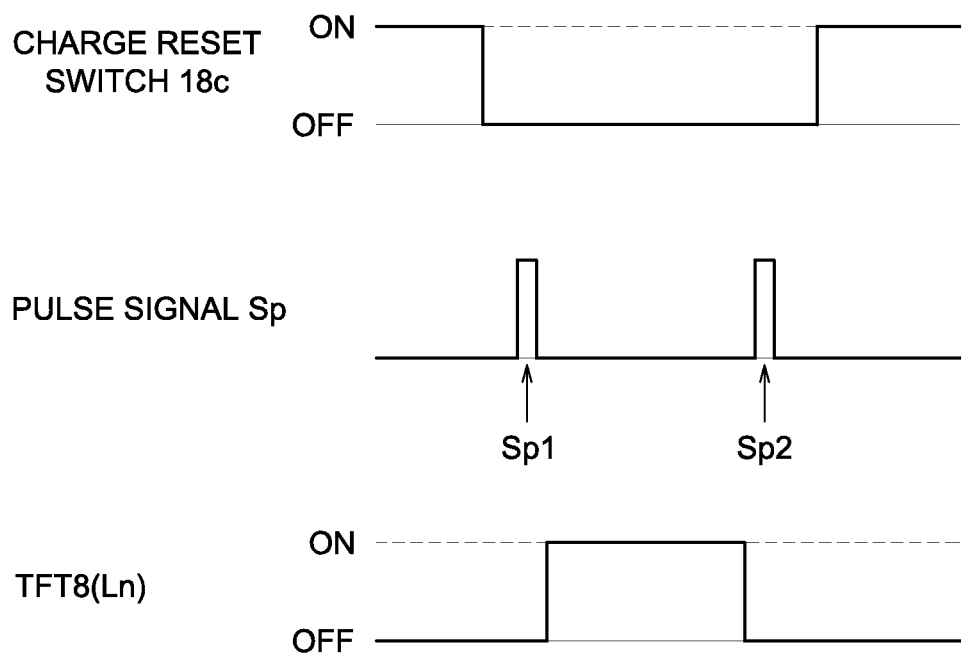
FIG. 10 is a timing chart showing timing of a charge reset switch in read-out processing of image data, pulse signals, and ON and OFF of TFT.

The correlation double sampling circuit 19 has a sample hold function. Therefore, at the time of the read-out processing of image data D from the respective radiation detecting elements 7, as shown in FIG. 10, upon receipt of pulse signals Sp1 from the control section 22 on the condition that the charge reset switch 18c of the amplification circuit 18 is turned off, the correlation double sampling circuit 19 holds the voltage value Vin output from the amplification circuit 18 at that time.

Subsequently, upon receipt of the second pulse signal Sp2 transmitted from the control unit 22 at a time when charge which flows out from the radiation detecting elements 7 by on and off of the TFT 8 is accumulated in the capacitor 18d of the amplification circuit 18, the correlation double sampling circuit 19 holds the voltage value Vfi output from the amplification circuit 18 at that time and outputs a difference of the voltage values (Vfi−Vin) as the analog values of image data D to the downstream side.

The image data D of the respective radiation detecting elements 7 outputted from the correlation double sampling circuit 19 are transmitted to an analog multiplexer 21, and further transmitted sequentially to an A/D converter 20 from the analog multiplexer 21. Then, the image data D are converted sequentially to image data D with digital values by the A/D converter 20, and the converted image data D are output to a recording section 23 and are stored by the recording section 23.

The control section 22 is constituted by a computer in which CPU (Central Processing Unit) (not shown), ROM (Read Only Memory), RAM (Random Access Memory), an input/output interface, and the like are connected to a bus, FPGA (Field Programmable Gate Array), and the like. The control section 22 may be constituted with an exclusive control circuit. The control section 22 is configured to control actions of respective members of the radiation image photographing apparatus 1. Moreover, as shown in FIG. 8, to the control section 22, a recording section 23 constituted by DRAMs (Dynamic RAM) and the like is connected.

Moreover, in this embodiment, to the control unit 22, the above-mentioned antenna unit 41 is connected, and further the battery 24 for supplying electric power to respective members, such as the detecting element P, the scan driving unit 15, the read-out circuit 17, the recording section 23, and bias power source 14 is connected. The battery 24 is equipped with a connection terminal used at the time of charging of the battery 24 with electric power supplied from the charging device (not shown) to the battery 24.

As mentioned above, the control unit 22 is configured to control the actions of the respective functioning sections of the radiation image photographing apparatus 1 in such a way that the control unit 22 controls the bias power source 14 so as to apply a bias voltage with a predetermined voltage to the respective radiation detecting elements 7 from the bias power source 14, transmits signals to actuate the gate driver 15b of the scan driving unit 15, and transmits pulse signal Sp1 and Sp2 to the correlation double sampling circuit 19.

[With Regard to the Processing in Radiation Image Photography]

Next, before explanation of the actual structure of the radiation image photographing apparatus 1 relating to this embodiment, explanation will be given ways of ordinary processing in the case where radiation image photography is conducted by use of the radiation image photographing apparatus 1. In the structure of the radiation image photographing apparatus 1 relating to this embodiment mentioned later, the processing in radiation image photography is conducted in the same ways as the following ordinary processing.

The ways of processing in radiation image photography may changes depending on whether or not signals and the like are exchanged between the radiation image photographing apparatus 1 and the radiation generating devices (not shown).

Hereafter, description will be given the outline of the ways of processing in radiation image photography in the case (hereafter, referred to a cooperation mode) where photography is conducted with exchanging of signals and the like between the radiation image photographing apparatus 1 and the radiation generating devices, and in the case (hereafter, referred to a non-cooperation mode) where the radiation image photographing apparatus 1 itself detects start of radiation irradiation without exchanging of signals and the like between the radiation image photographing apparatus 1 and the radiation generating devices.

[In the Case of a Cooperation Mode]

Figure 11:
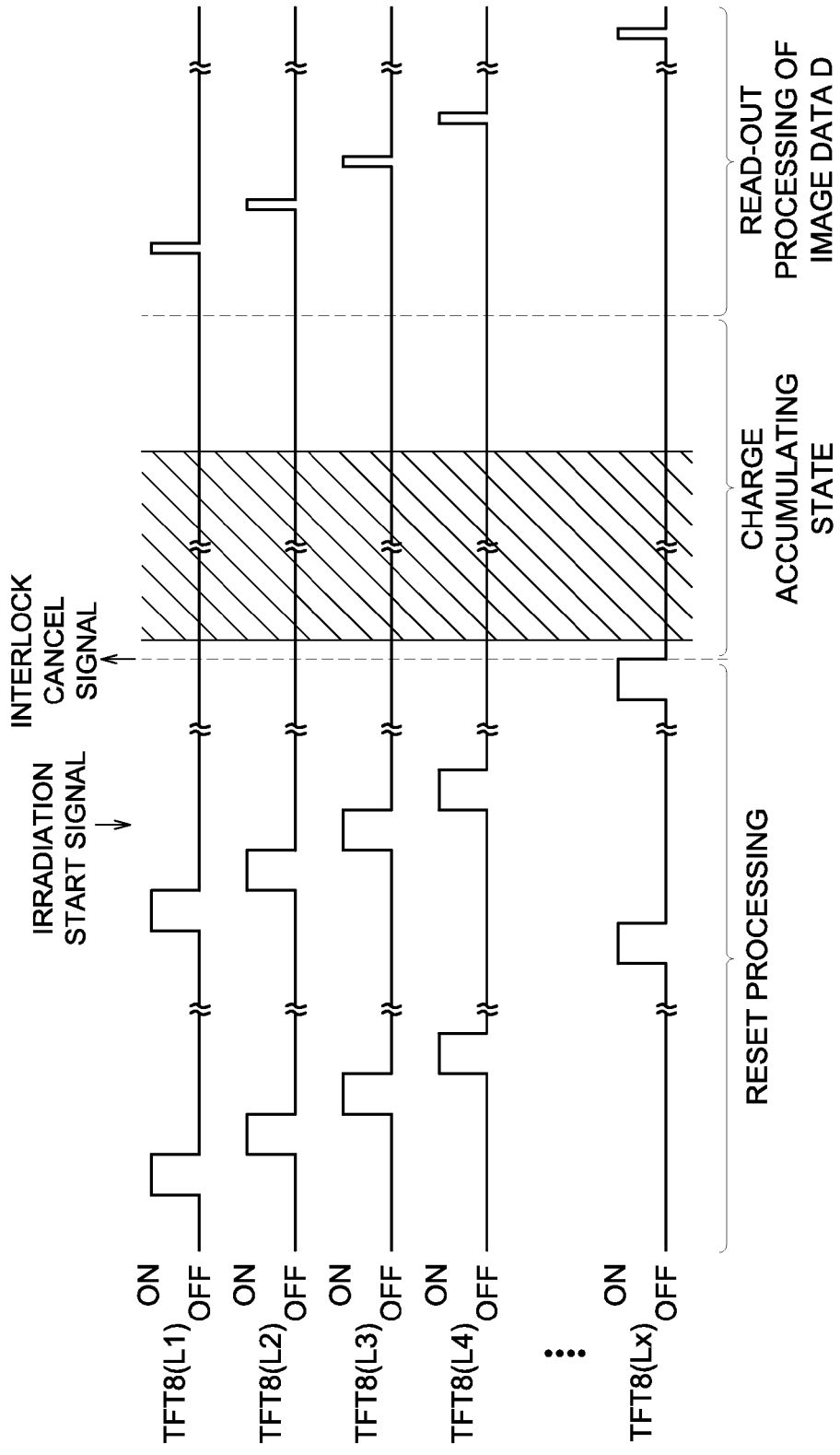
FIG. 11 is a timing chart showing timing to apply ON voltage and OFF voltage to each scanning line in radiation image photography performed on a cooperation mode.

In the case of a cooperation mode in which photography is conducted with exchanging of signals and the like between the radiation image photographing apparatus 1 and the radiation generating devices, as shown in FIG. 11, usually, before irradiation (refer to the shadow area in the drawing) of radiation is conducted to the radiation image photographing apparatus 1, ON voltage is applied to the respective lines L1 to Lx of the scanning lines 5 sequentially from the gate driver 15b of the scan driving section 15, so that reset processing of the respective radiation detecting elements 7 is performed.

Subsequently, if a irradiation start signal showing an intention to start irradiation of radiation from a radiation generating device is transmitted in the middle of performing of reset processing for the radiation detecting elements 7, at a time point when the reset processing conducted at that time proceeds to the final line Lx of the scanning lines 5 and is completed, the control section 22 of the radiation image photographing apparatus 1 applies OFF voltage to all the lines L1 to Lx of the scanning lines 5 so as to turn off all the TFTs 8, and shifts to a charge accumulating state in which the respective radiation detecting elements 7 accumulate charge generated in the respective radiation detecting elements 7 by irradiation of radiation.

Moreover, simultaneously with it, the control section 22 transmits an interlock cancellation signal to the radiation generating device. Upon receipt of the interlock cancellation signal transmitted from the radiation image photographing apparatus 1, the radiation generating device irradiate radiation to the radiation image photographing apparatus 1.

At a time when, for example, a predetermined time is elapsed after the interlock cancellation signal has been transmitted to the radiation generating device, the control unit 22 applies ON voltage sequentially to the respective lines L1 to Lx of the scanning line 5 so that read-out processing of image data is conducted so as to read out image data D from the respective radiation detecting elements 7.

As shown in FIG. 11, in the charge accumulation state, the respective TFTs 8 are made in OFF state, and dark charges generated in the respective radiation detecting elements 7 are accumulated in the respective radiation detecting elements 7 during this state. Therefore, in image data D read out by the following read-out processing, in addition to useful charges generated in the respective radiation detecting elements 7 by irradiation of radiation, dark charges accumulated in the respective radiation detecting elements 7 during the OFF state of the respective radiation detecting elements 7 are also read out.

Therefore, although illustration is omitted, usually, after the read-out processing of image data, and before a series of processing in radiation image photography shown in FIG. 11, reset processing for the respective radiation detecting elements 7 is conducted in the same way as that shown in FIG. 11 so as to sift the charge accumulating state, and then read-out processing is conducted for offset data O corresponding to offset component caused by dark charges included in image data D in the same way as that read-out processing for image data D. In this connection, at the time of read-out processing for offset data O, radiation is not irradiated to the radiation image photographing apparatus 1.

[In the Case of a Non-cooperation Mode]

On the other hand, in the case of a non-cooperation mode, since signals and the like are not exchanges between the radiation image photographing apparatus 1 and the radiation generating device, the radiation image photographing apparatus 1 itself is required to detect irradiation of radiation.

Various techniques may be adopted as the method for detecting irradiation of radiation by radiation image photographing apparatus 1 itself Hereafter, explanation will be made about the case where read out processing of image data is conducted before radiation image photography, and the start of irradiation of radiation is detected based the read-out image data. In order to discriminate the image data from image data D being actual image to be read out after the charge accumulating state, hereafter, image data read out before radiation image photography is represented with image data d.

Figure 12:
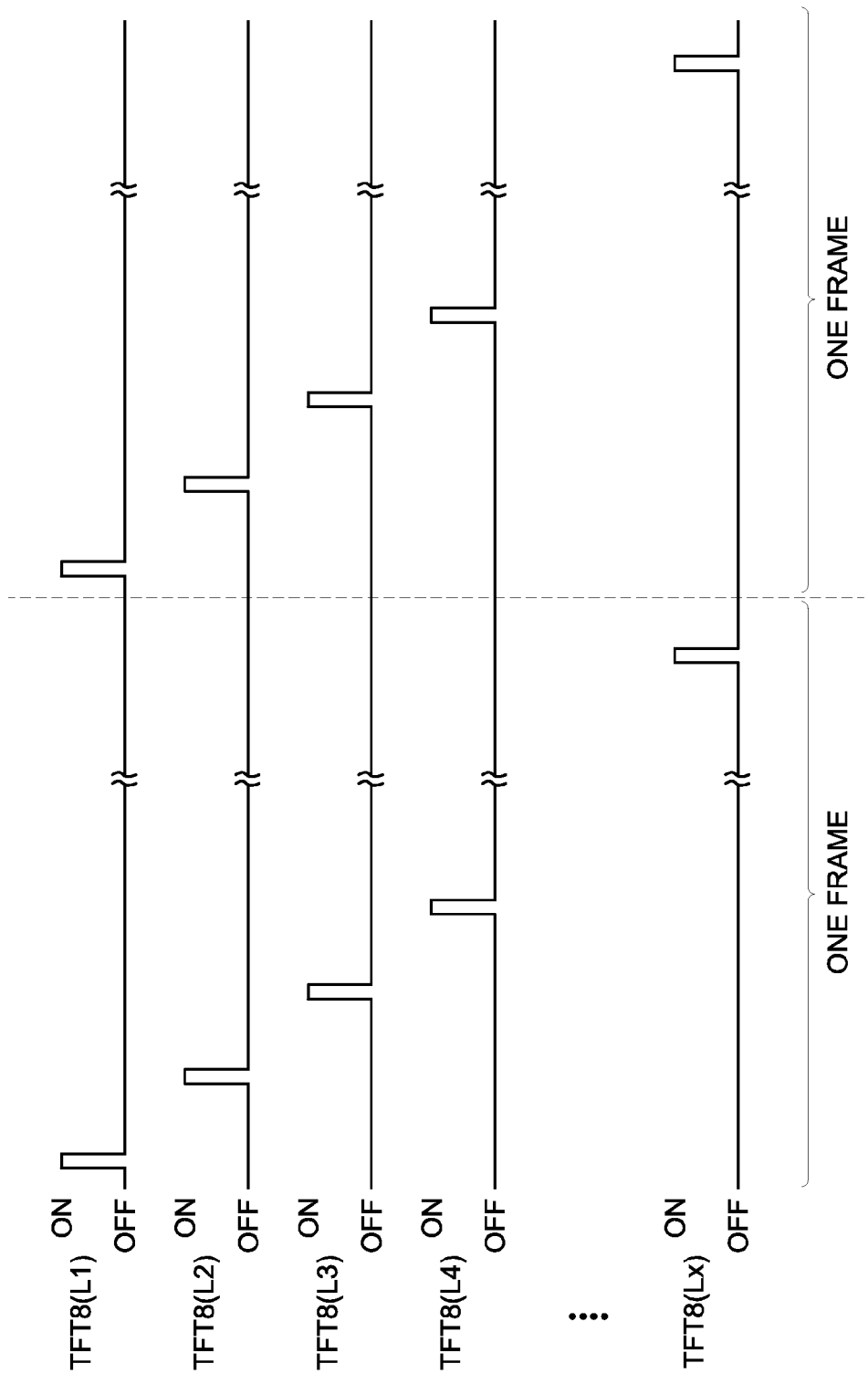
FIG. 12 is a timing chart showing timing to apply ON voltage and OFF voltage to each scanning line in read-out processing of image data performed before photography in the case where radiation image photography is performed on a non-cooperation mode.

In this case, as shown in FIG. 12, before radiation image photography, ON voltage is applied sequentially to the respective lines L1 to Lx of the scanning line 5 from the gate driver 15b, and the read-out processing is performed for image data d from the respective radiation detecting elements 7.

In FIG. 12, one frame means a period of time to perform the read-out processing for image data d from the respective radiation detecting elements 7 arrange on one plane in a two dimensional form on the detecting section P (refer to FIG. 4 and FIG. 8).

Figure 13:
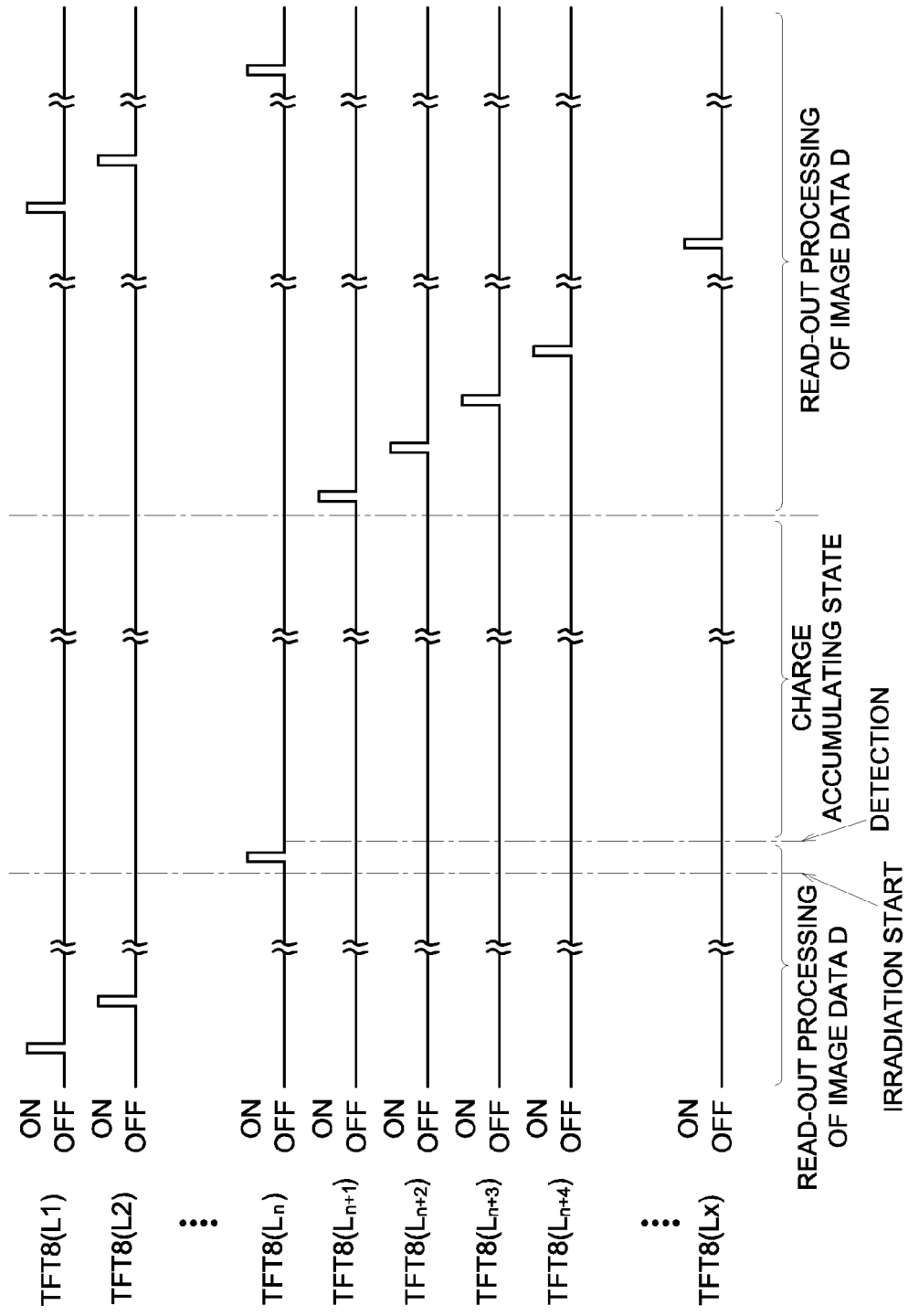
FIG. 13 is a timing chart showing timing to apply ON voltage and OFF voltage to each scanning line in radiation image photography performed on a non-cooperation mode.

As shown in FIG. 13, in the read-out processing for image data d before radiation image photography, if irradiation of radiation is started at a time when ON violated is applied to, for example, a line Ln of the scanning line 5 or immediately before the time, since the read-out image data d contains the charges generated in the respective radiation detecting elements 7 by the irradiation of radiation, the value of the image data d becomes larger significantly than image data d read out before that time.

Then, it may be constituted that for example, the control unit 22 is configured to monitor image data d read out by read-out processing before radiation image photography, and at a time when the read-out image data d exceeds, for example, a preset threshold value dth, the control unit 22 detects that irradiation of radiation is started. In this way, even in the case of the non-cooperation mode in which the radiation image photographing apparatus 1 is not provided with information such as an irradiation start signal from the radiation generating device side as with the cooperation mode, the radiation image photographing apparatus 1 itself detects the situation that radiation was irradiated, so that radiation image photography can be conducted adequately.

Upon detection of the situation that irradiation of radiation was started, the control unit 22 finishes the read-out processing for image data d immediately at the time, applies OFF voltage to all the lines L1 to Lx of the scanning line 5 from the gate driver 15b so as to bring the respective TFTs 8 onto the OFF state, and shifts to a charge accumulating state.

Subsequently, when a predetermined time elapses after detection of the start of radiation irradiation, for example and, the control unit 22 applies ON voltage sequentially to the respective lines L1 to Lx of the scanning line 5 from the gate driver 15b, and performs the read-out processing for image data D as an actual image.

In this case, as shown in FIG. 13, if a line Ln of the scanning line 5 in the case of FIG. 13 is a scanning line 5 applied with ON voltage at a time when the start of radiation irradiation was detected in the read-out process for image data d before radiation image photography or immediately before that time, read-out processing for image data D may be conducted by starting application of ON voltage to the next line Ln+1 of the scanning line 5 to be applied with ON voltage successively after the line Ln of the scanning line 5, or read-out processing for image data D may be conducted by applying ON voltage sequentially from the initial line L1 of the scanning line 5.

Moreover, also in the non-cooperation mode, read-out processing for offset data O is conducted in such a way that a series of processing in radiation image photography shown in FIG. 13 is repeated before or after radiation image photography on the condition that radiation is not irradiated to the radiation image photographing apparatus 1.

[With Regard to Causes which Produce Cross Talk in a Scanning Line Direction]

Figure 22A:
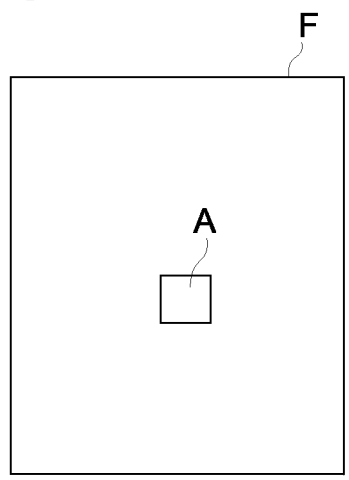
FIG. 22A is a diagram showing a portion A irradiated with radiation in a radiation image photographing apparatus.
Figure 22B:
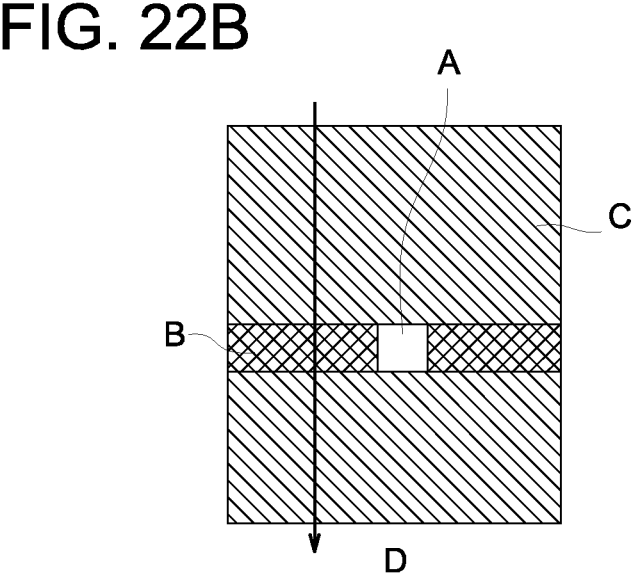
FIG. 22B is a diagram showing a situation that the image data of a portion B adjoining the portion A in the scanning line direction becomes smaller than the image data of the other portion C.
Figure 23:
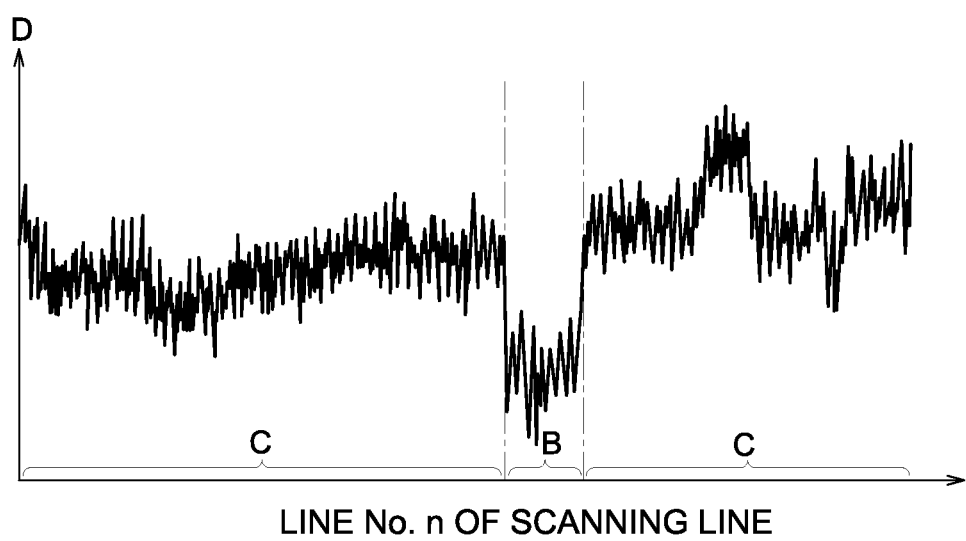
FIG. 23 is a graph showing transition of the image data in the case of observation in the arrowed mark direction.
Figure 24A:
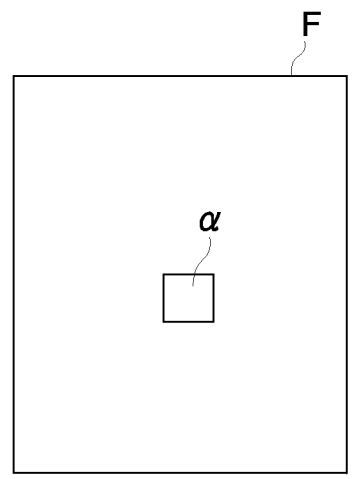
FIG. 24A is a diagram showing a portion α which is shielded from the irradiated radiation.
Figure 24B:
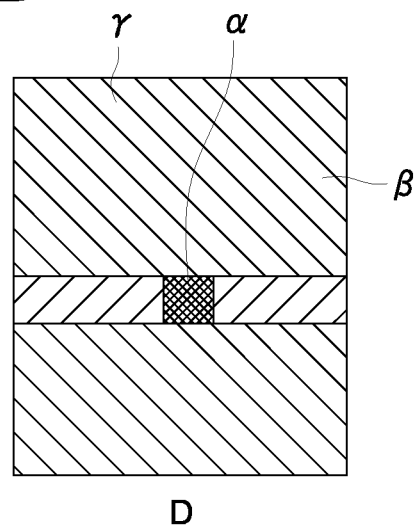
FIG. 24B is a diagram showing a situation that the image data of a portion β adjoining the portion α in the scanning line direction becomes larger than the image data of the other portion γ.

Now, before explanation of the actual structure of the radiation image photographing apparatus 1 relating to this embodiment, description will be given with regard to causes which produce cross talk in a scanning line direction as shown in FIG. 22B and FIG. 24B when radiation is irradiated as shown in FIG. 22A and FIG. 24A.

Figure 14:
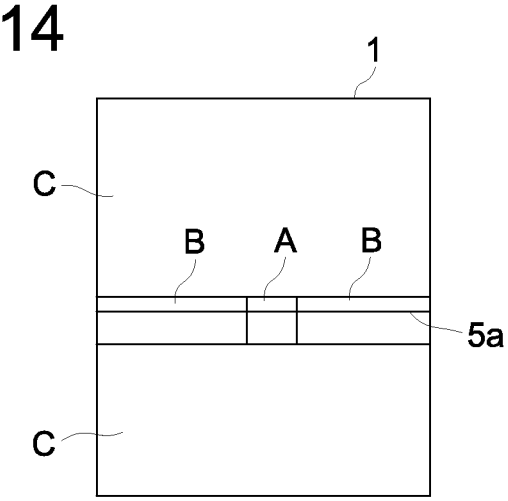
FIG. 14 is a diagram showing portions irradiated with radiation, portions in the scanning line direction, and scanning lines connected to TFT of respective radiation detecting element located on respective portions.

The present inventors conducted observation experiments such that after radiation was irradiated to the radiation image photographing apparatus 1 on the condition that the irradiation field was limited to a small region as shown in FIG. 22A, the experiments was made to observe how the voltage V at the probe point p (refer to FIG. 4) connected the connecting line 10 of bias lines 9 changes when image data D are read out from radiation detecting elements 7 by application of On voltage to scanning lines 5a connected to TFT 8 of respective radiation detecting elements 7 positioned at the portion A (as shown in FIG. 14) irradiated with radiation as shown in FIG. 14 and the portion B (as shown in FIG. 22B) in the scanning direction.

That is, in this case, the fluctuation, at the probe point p side end portion, of the bias voltage applied onto the connection line 10 is made to be observed (hereafter, the bias voltage on the probe point is temporarily referred to as Vbias (p)). Further, at the same time, as the comparative test, the observation is made to the fluctuation of the bias voltage (hereafter, this bias voltage is temporarily referred to as Vbias (11)) at the input/output terminal 11 where is a point to apply the bias voltage from the bias source 14 (refer to FIG. 8) to the connection line 10 and is connected with the connection line 10.

Figure 15:
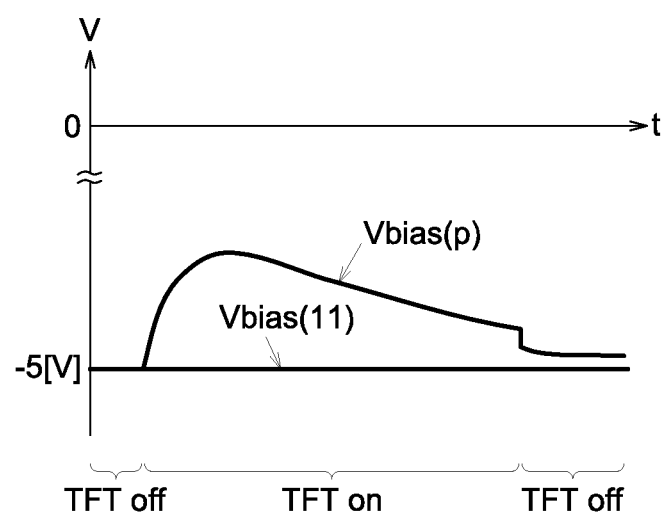
FIG. 15 is graph showing time shift of the bias voltage on a probe point of connection lines and input/output terminal in the case where respective TFTTs perform ON and OFF actions in the structure of FIG. 4.

As a result, as shown in FIG. 15, during a period that electron is discharged from each radiation detecting element 7, in which ON voltage is applied to the scanning line 5a, to the signal line 6, the bias voltage Vbias (11) at the input/output terminal 11 keeps −5 [V] supplied from the bias source 14. On the other hand, it turns out that the bias voltage Vbias (p) at the probe point p being the opposite end portion of the connection line 10 raises once from −5 [V] to about 100 [mV] immediately after the scanning line 5a is applied with ON voltage and TFT is turned on.

Further, at a time immediately before the voltage applied to the scanning line 5a is changed from ON voltage to OFF voltage, the bias voltage Vbias (p) did not lower to the initial voltage of −5 [V] and indicated the slightly high voltage than −5 [V].

The above results of the experiments are the result in the case where 1000 bias lines 9 (refer to FIG. 4) are bound with a single connection line 10. Then, this time, a sensor panel SP with a smaller size is formed and about 400 bias lines 9 are bound with a single connection line 10. Subsequently, as with the above, experiment was conducted such that radiation was irradiated to the radiation image photographing apparatus 1 on the condition that the irradiation field was limited to a small region, ON voltage was applied to the scanning line 5a, and image data D are read out.

Figure 16:
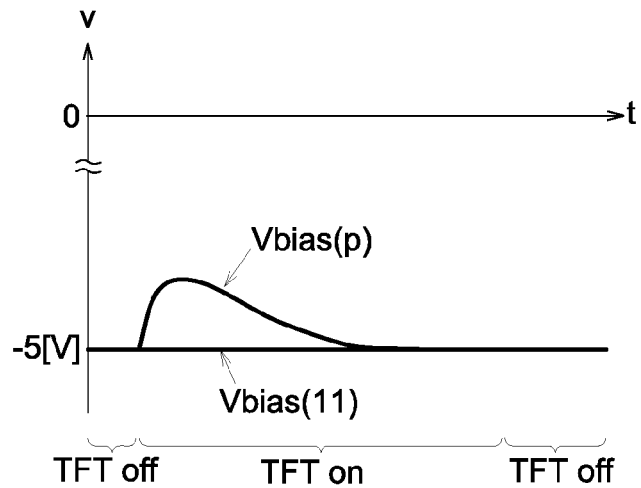
FIG. 16 is graph showing time shift of the bias voltage on a probe point of connection lines and input/output terminal in the case where respective TFTTs perform ON and OFF actions on the condition that the number of bias lines connected to a connection line is reduced in the structure of FIG. 4.

As a result, as shown in FIG. 16, immediately after the scanning line 5a is applied with ON voltage and TFT is turned on, the bias voltage Vbias (p) at the probe point p of the connection line 10 raised once form −5 [V]. However, the bias voltage Vbias (p) decreased comparatively promptly and lowered to the initial voltage of −5 [V] before the voltage applied to the scanning line 5a is changed from ON voltage to OFF voltage.

Then, in this case, when ON voltage was applied sequentially to respective lines L1 to Lx of the scanning line 5 and image data D were read out, cross talk in the scanning line as shown in FIG. 22, that is, a phenomenon that the image data D of the portion B of the respective radiation detecting elements 7 connected to the same scanning line with the respective radiation detecting elements 7 on the portion A irradiated with radiation became smaller than the image data D of the respective radiation detecting elements 7 on the other portion C did not occur. As a result, the obtained result was that the image data read out from the respective radiation detecting elements 7 on the portion B and the portion C to where radiation was not irradiated became the almost same value.

From these experimental results, the causes that cross talk occur on the scanning line as shown in FIG. 22B in the case where, for example, irradiation was irradiated as shown in FIG. 22A, may be considered as follows.

Namely, in the structure of the radiation image photographing apparatus 1 shown in FIG. 4, when radiation is irradiated to a part of the respective radiation detecting elements 7 arranged in the two dimensional form (in this embodiment, when the irradiated radiation is converted to electromagnetic waves and the electromagnetic waves are irradiated to a part of the respective radiation detecting elements 7), in the i layer 75 (refer to FIG. 6) of the respective radiation detecting elements 7 irradiated with the radiation (or, the electromagnetic waves, the same in the following), electron hole pairs are generated, and the electrons move to the first electrode 73 side along the electric potential slope formed in the i layer 75 and the holes move to the second electrode 77 side.

Then, in the read-out processing of image data D, when ON voltage is applied to the scanning line 5 and TFT 8 is made ON state, electrons accumulated at the first electrode 73 side of the radiation detecting element 7 are discharged to the signal line 6 via the TFT 8 and read out as image data D in the read-out circuit 17. At the same time, the holes accumulated in the second electrode 77 side of the radiation detecting element 7 are made to flow out to the bias line 9 and flow into the bias source 14 (refer to FIG. 8) via the connection line 10.

At this time, the holes flowing from the respective radiation detecting elements 7 irradiated with radiation to the respective bias lines 9 concentrate in the connection line 10. Accordingly, a lot of holes flow in the connection line 10. As a result, since the connection line 10 made of Al, Cr and the like has a electric resistance, voltage increase occurs in the connection line 10, and then the bias voltage Vbias (p) at the probe point p side becomes higher than the bias voltage Vbias (11) at the input/output terminal 11 side (that is, a bias voltage of −5 [V]).

Accordingly, as shown in FIG. 15 and FIG. 16, it may be considered that when the TFT 8 is made ON state, the bias voltage Vbias (p) at the probe point p of the connection line 10 raises temporarily.

When 1000 bias lines 9 are connected to the single connection line 10, the length of the connection line 10 becomes longer as compared with the case where about 400 bias lines 9 are connected to the single connection line 10. Accordingly, although the resistance value per unit length is the same between the former case and the latter case, the resistance value of the entire connection line 10 of the former case becomes larger by the longer portion in length of the connection line 10 than the latter case.

Therefore, in the case where 400 bias lines 9 are connected to the single connection line 10, the voltage increase occurring in the connection line 10 becomes smaller, and the bias voltage Vbias (p) which increased temporarily returns comparatively promptly to the original voltage of −5 [V]. In contrast, in the case where about 1000 bias lines 9 are connected to the single connection line 10, the voltage increase occurring in the connection line 10 becomes larger, and the bias voltage Vbias (p) which increased temporarily does not return to the original voltage of −5 [V] and becomes a voltage slightly higher than −5 [V] until the voltage applied to the scanning line 5a is switched from ON voltage to OFF voltage.

Next, as with the case where about 1000 bias lines 9 are connected to the single connection line 10, in the case where the bias voltage Vbias (p) does not return to the original voltage (that is, in the above-mentioned case, −5 [V]) at a time point before the voltage applied to the scanning line 5a is changed from ON voltage to OFF voltage, the following phenomena occur in the respective radiation detecting elements 7 on the portion B shown in FIG. 14.

Figure 17:
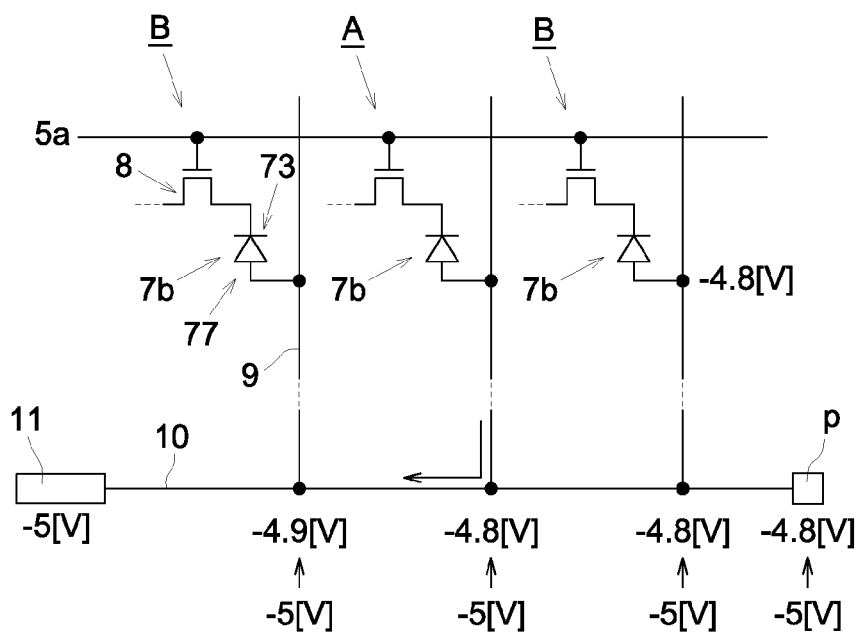
FIG. 17 is a diagram showing the bias voltages applied to respective portions of connection lines immediately before the voltage applied to the scanning lines is switched from ON voltage to OFF voltage.

In the following FIG. 17, the respective radiation detecting elements 7 located on the portion A irradiated with radiation are simplified as 7a, and the respective radiation detecting elements 7 which are located on the same scanning line with the respective radiation detecting elements 7 located on the portion A and on the portion B not irradiated with radiation are simplified as 7b.

In this case, in the state that OFF voltage is applied to the scanning line 5a before a read-out action is started, the bias voltage Vbias with the initial voltage of −5 [V] is applied to the second electrode 77 of each radiation detecting element 7b. Although the respective radiation detecting elements 7b are not irradiated with radiation, dark charge is generated and accumulated in the charge accumulation state (refer to FIG. 11 and FIG. 13) during a period that the TFT 8 is made OFF state. For example, it is supposed that the dark charge of 0.5 [V] is accumulated in the respective radiation detecting elements 7b.

Accordingly, at a time before a read-out action is started, the voltage of the second electrode 77 of each radiation detecting elements 7b is −5 [V] (namely, the bias voltage Vbias), and the voltage of the first electrode 73 becomes −0.5 [V]. In this case, the voltage of the source electrode 8s of the TFT 8 connected to each radiation detecting element 7b is the same voltage of −0.5 [V] as the voltage of the first electrode 73 of the radiation detecting elements 7b, and the voltage of the drain electrode 8d becomes the same voltage of 0 [V] as the voltage of the signal line 6.

When ON voltage is applied to the scanning line 5a upon start of a read-out action, the voltage on the connection line 10 and the bias lines 9 rises temporarily and lowers as mentioned above. However, it is supposed that the bias voltage Vbias immediately before the voltage applied to the scanning line 5a is switched from ON voltage to OFF voltage does not return to the original voltage of −5 [V] and becomes a voltage slightly higher than −5 [V]. For example, it is supposed that the bias voltage Vbias becomes −4.8 [V].

Then, in the respective radiation detecting elements 7b, with the rising of the bias voltage Vbias applied to the second electrode 77 from the initial voltage of −5 [V] to −4.8 [V] by 0.2 [V], the voltage at the first electrode 73 side becomes only −0.3 [V], not −5 [V] as mentioned above. Successively, the voltage of the source electrode 8s of the TFT 8 connected to each radiation detecting element 7b becomes the same voltage of −0.3 [V] with the voltage of the first electrode 73 of the radiation detecting element 7b, and since the voltage of the drain electrode 8d is 0 [V], only the dark charge (electrons) of 0.3 [V] flows into the signal line 6.

That is, since only the voltage of 0.3 [V], not the original voltage of 0.5 [V], is readout as the dark charge to be read out as image data D from the respective radiation detecting elements 7b. As a result, the value of the image data D read out from the respective radiation detecting elements 7b becomes smaller.

Meanwhile, in the case where there is no radiation detecting element 7 irradiated with radiation as with the portion A as shown in FIG. 14 among the respective radiation detecting elements 7b connected to the same scanning line 5, that is, on the portion C not irradiated with radiation shown in FIG. 14, the above-mentioned fluctuation of the bias voltage Vbias does not occur. Accordingly, from the respective radiation detecting elements 7 on the portion C, dark charge with the voltage of 0.5 [V] to be read out as the above-mentioned image data D flows out to the signal line 6.

Therefore, from the respective radiation detecting elements 7 on the portion C, image data D equivalent to the accumulated dark charge with the voltage of 0.5 [V] is read out as an original value.

In this way, as shown in FIG. 22B, the phenomenon that the image data D the portion B of the respective radiation detecting elements 7 connected to the same scanning line 5 with the respective radiation detecting elements 7 on the part A which irradiated with radiation become smaller than the image data D of the respective radiation detecting elements 7 on the other part C, i.e., it may be considered that cross talk in the scanning line direction occurs.

In the case where about 400 bias lines 9 are connected to a single connection line 10, after ON voltage was applied to the scanning line 5a in the read-out processing of image data D, the bias voltage Vbias immediately before the voltage applied to the scanning line 5 is switched from ON voltage to OFF voltage returns to the original voltage of −5 [V].

Therefore, the fluctuation of the bias voltage Vbias as with the above does not occur in the radiation detecting elements 7b, and as a result, the dark charge with the original voltage of 0.5 [V]s is read out. Accordingly, between the respective radiation detecting elements 7 on the portion B and the respective radiation detecting elements 7 on the portion C, the amount of dark charge to be read out as image data become the same amount. Consequently, it is considered that cross talk in the scanning line direction as with the above does not occur.

Moreover, the cause of the cross talk which occurs in the scanning line direction as shown in FIG. 24B when radiation is irradiated as shown in FIG. 24A may be assumed in the same way with the above.

Namely, in the portion (i.e., the portion γ shown in FIG. 24B) where all of the radiation detecting elements 7 connected to the same scanning line 5 are irradiated with radiation, a lot of holes flow into the connection line 10 through the bias lines 9 from all the radiation detecting elements 7 at the time of the read-out processing of image data D. Accordingly, since the bias voltage Vbias increases greatly, the bias voltage Vbias immediately before the voltage applied to the scanning line 5 is switched from ON voltage to OFF voltage does not return to the original voltage of −5 [V] and becomes a voltage which increases comparatively greatly from −5 [V].

Therefore, the value of read-out image data D becomes smaller with the fluctuation of the bias voltage Vbias than the image data D with the magnitude caused by the original dark charge (i.e., image data D with the magnitude caused by the dark charge with the original voltage of 0.5 [V] if said in the above-mentioned examples).

In contrast, when image data D are read out from the respective radiation detecting elements 7 on the portion α which was not irradiated with radiation with shielding of radiation by a shielding plate and on the portion β on the same scanning line direction, since the amount of holes which flows from the respective radiation detecting elements 7 on the portion α which was not irradiated with radiation is small, the degree of the voltage increase in the connection line 10 becomes small corresponding to the small amount of holes.

Therefore, at least in the respective radiation detecting elements 7 on the portion β, after the bias voltage Vbias applied to the respective radiation detecting elements 7 rose once, the bias voltage Vbias immediately before the voltage applied to the scanning line 5a is switched from ON voltage to OFF voltage does not return to the original voltage of −5 [V] and the degree of rising in voltage from −5 [V] becomes smaller than the case of the respective radiation detecting elements 7 on the portion γ.

Therefore, at least in the respective radiation detecting elements 7 on the portion β, the degree that image data D becomes smaller than the original value with the fluctuation of the bias voltage Vbias becomes smaller than that in the respective radiation detecting elements 7 on the portion γ. Accordingly, it may be considered that the value of the image data D read out from the respective radiation detecting elements 7 on the portion β becomes larger than the value of the image data D read out from the respective radiation detecting elements 7 the portion γ.

[Structure of the Radiation Image Photographing Apparatus 1 Relating to this Embodiment]

As described above, according to the studies by the present inventors, it is considered that the cause of cross talk in the scanning direction is due to the fact that since the connection line 10 of the bias lines 9 is long, the resistance value of the connection line 10 becomes large.

As mentioned above, at the time of read-out processing of image data D, since a lot of holes which flow from the respective second electrodes of a lot of radiation detecting elements 7 irradiated with radiation flow in the connection line 10 with the large resistance value, the bias voltage Vbias which rose once cannot return to the original bias voltage Vbias (for example, −5 [V]) during a period that the voltage applied to the scanning line 5 is switched from ON voltage to OFF voltage. As a result, it may be considered that cross talk occurs in the scanning line direction.

Therefore, as shown in FIG. 18, this embodiment is constituted such that the connection line 10 to which the respective bias lines 9 are connected is divided into two or more parts, and the predetermined number of bias lines 9 is connected to either one connection line among the two or more connection lines 10a, 10b, . . . , 10z.

Figure 19:
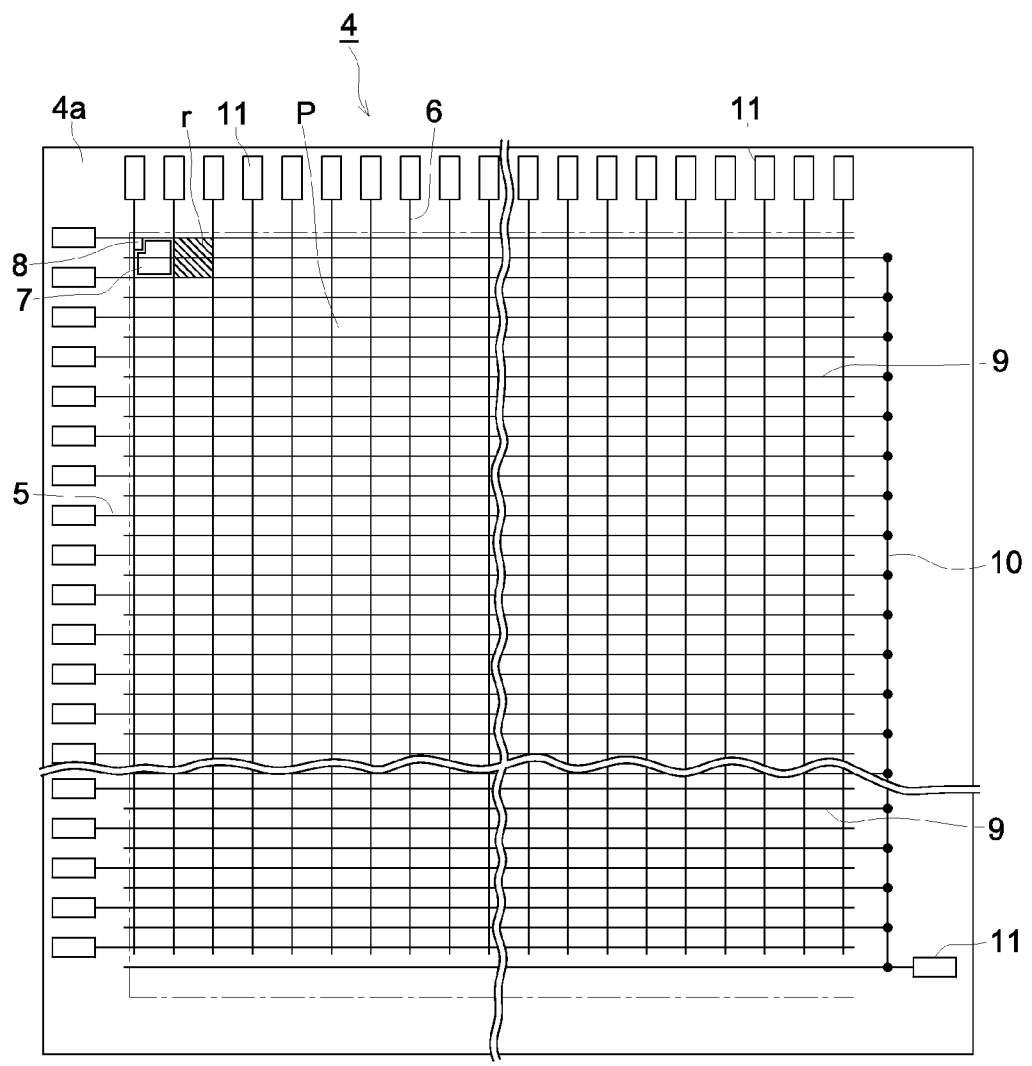
FIG. 19 is a plan view showing a structure of a base plate of a radiation image photographing apparatus in which respective bias lines are disposed in parallel to scanning lines.

The bias voltage Vbias is supplied from the bias source 14 to the input/output terminal to which the respective connecting lines 10a to 10z are connected, whereby the bias voltage Vbias is applied to the respective connection lines 10a to 10z. In turn, the respective radiation detecting elements 7 are applied with the bias voltage Vbias via the respective bias lines 9 connected to the respective connection lines 10a to 10z. FIG. 18 and FIG. 19 show the case of the base plate 4 with the actual specification in which the probe point p is not disposed.

With this structure, at the time of the read-out processing of image data D from the respective radiation detecting elements 7, if a lot of holes flow out from the respective radiation detecting elements 7 irradiated with radiation upon application of ON voltage to a single scanning line 5 and flow into the respective connection lines 10a to 10z, since the resistance value of each of the connection lines 10a to 10z is small, although the bias voltage Vbias applied to the respective bias lines 9 via the connection lines 10a to 10z rises temporarily, the bias voltage Vbias returns to the original bias voltage Vbis promptly.

That is, with the structure shown in FIG. 18, the detecting unit P of, so to speak, a large panel in which for example, about 1000 bias lines 9 are connected is divided into small panels for the respective connection lines 10a to 10z. Then, since the portions of the small panels function respectively as the above-mentioned case where about 400 bias lines 9 are connected, even if a lot of holes flow into each of the connection lines 10a to 10z, the bias voltage Vbias returns to the original bias voltage Vbis (that is, for example, −5 [V]) before the voltage applied to the scanning line 5 is switched from ON voltage to OFF voltage.

Further, since the number of the bias lines 9 connected to a single connection line 10a and the like becomes fewer than that in the case where all the bias lines 9 are connected to the connection line 10, the amount of holes which flow from the respective radiation detecting elements 7 irradiated with radiation into the connection line 10a and the like becomes smaller.

Thus, in the case where the structure is made as mentioned above, the resistance of the respective connecting lines 10a to 10z becomes small, and further the amount of holes which flow into the respective connecting lines 10a to 10z becomes small. Accordingly, the degree of rise of the temporarily-rising bias voltage Vbias becomes small, and the bias voltage Vbias which rises once returns adequately to the original bias voltage Vbis before the voltage applied to the scanning line 5 is switched from ON voltage to OFF voltage.

Therefore, cross talk in the scanning line direction can be prevented from occurring by the structures that the connection line 10 to which the respective bias lines 9 are connected is divided into a plurality of portions as shown in FIG. 18, the respective bias lines 9 are connected for each of the predetermined number of bias lines to either one of the connection lines 10a to 10z, and the bias voltage Vbias is applied from the bias source 14 to the respective connection lines 10a to 10z.

With regard to the number of lines in the respective connection lines 10a to 10z (i.e., a single connection line is divided into how many connection lines), as long as the number of lines ensures that the bias voltage Vbias which rises once returns to the original bias voltage Vbis before the voltage applied to the scanning line 5 is switched from ON voltage to OFF voltage, the appropriate number of lines may be determined in consideration of the structure of the base plate 4.

Moreover, the predetermined number of the bias lines 9 connected to the respective connecting lines 10a to 10z does not need to be the same number for each of the respective connecting lines 10a-10z, and as long as the above-mentioned conditions are fulfilled, it may be possible to determine the proper number for each of the connecting lines 10a to 10z. For the sake of simplicity, FIG. 18 shows the case where five or three bias lines 9 are connected to the respective connecting lines 10a to 10z. However, as long as the bias voltage Vbias which rises once returns surely to the original bias voltage Vbis before the voltage applied to the scanning line 5 is switched from ON voltage to OFF voltage, the number of bias lines 9 with the order of 100 may be connected.

In FIG. 18, the input/output terminals 11 to which the respective connection lines 10a to 10z are connected are disposed on the end portion of the base plate 4 which is opposite to the input/output terminals 11 to which the respective signal lines 6 are connected, a flexible circuit board (not shown) is connected to the input/output terminals 11 of the respective connection lines 10a to 10z on the end portion of the base plate 4 which is opposite to the flexible circuit board 12 (refer to FIG. 7) connected to the input/output terminals 11 connected to the respective signal lines 6, and the flexible circuit board is extended to the PCB base plate 33 side located at the reverse side of the base plate 4 where the bias source 14 is disposed.

However, the present invention is not limited to this structure. For example, although the illustration is omitted, it may be structured as follows. The respective connection lines 10a to 10z are disposed on the base plate at the input/output terminals 11 connected to the respective signal lines, and the input/output terminals 11 of the respective connection lines 10a to 10z are disposed at the same side with the input/output terminals 11 of the signal lines 6. Then, the flexible circuit board to connect the input/output terminals 11 of the respective connection lines 10a to 10z to the bias source 14 is disposed on the end portion of the base plate 4 at the same side with the flexible circuit board 12 (refer to FIG. 7) connected to the input/output terminals 11 of the signal lines 6.

Furthermore, it may be structured as follows. The respective bias lines 9 which prolong in the existing line of the signal lines 6 are divided, for example, at respective central portions into upper and lower groups, the respective bias lines 9 are connected to the respective connection lines at the upper end portion and the lower end portion of the base plate 4 in the figure, the respective input/output terminals 11 are disposed on the both end portions of the base plate 4 and are connected respectively to the flexible circuit boards on the both end portions of the base plate 4.

[Another Structure of the Radiation Image Photographing Apparatus 1 Relating to this Embodiment]

Figure 20:
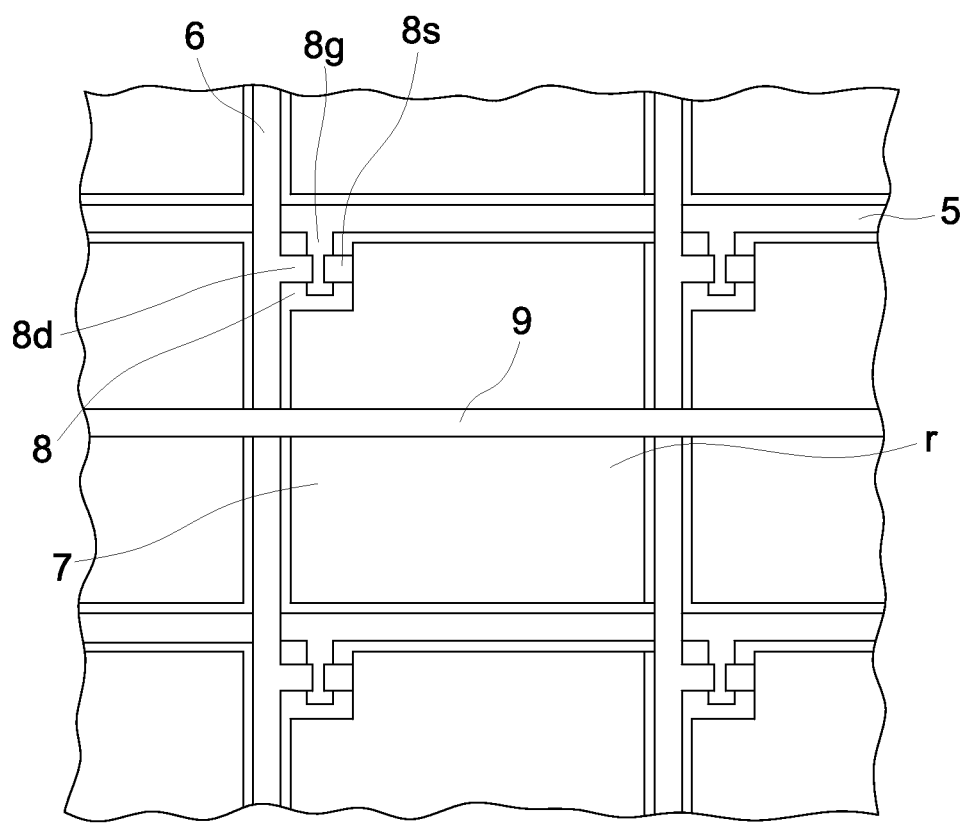
FIG. 20 is an enlarged view of FIG. 19.

Meanwhile, there may be a case where the respective bias lines 9 are disposed in not parallel to the respective signal lines 6 as shown in FIG. 19 and FIG. 20, and in parallel to the respective scanning lines 9. In the case of this structure, the respective bias line 9 faction respectively as the connection lines shown in FIG. 4.

At the time of read-out processing of image data D, upon application of ON voltage onto a single scanning line 5, a lot of holes flow from the respective radiation detecting elements 7 which are connected to the scanning line 5 via the respective TFT 8 and are irradiated with radiation, to the bias lines 9. Further, the respective bias lines 9 are disposed from one end side to the other end side of the detecting unit P and are long. Accordingly, the resistance value of the entirety of a single bias line 9 becomes large.

Accordingly, when a lot of holes flow into the bias line 9 with the large resistance value, a voltage increase caused in the bias line 9 become large. Therefore, the bias voltage Vbias which increased temporarily does not return to the original bias voltage Vbias until the voltage applied to the scanning line 5 is switched from ON voltage to OFF voltage, and becomes a voltage slightly higher than the original bias voltage Vbias. As a result, even in the case where the respective bias lines 9 are disposed to be elongated in the scanning line direction, cross talk may occur in the scanning line direction as with the above.

Then, in the ease where the respective bias lines 9 in the radiation image photographing apparatus 1 are disposed to be elongated in the scanning line direction as mentioned above, for example, as shown in FIG. 21, the respective radiation detecting elements 7 which are arranged in the scanning line direction (the direction indicated with an arrowed mark V in the figure) and correspond to one raw, are divided into multi divisions, and for each division, a single bias line 9 is connected to the respective radiation detecting elements 7 in one division, so that the respective bias lines 9 can be connected to the respective radiation detecting elements 7 on the detecting unit P.

Namely, to put it simply, the respective bias lines 9 which are connected to the respective radiation detecting elements 7 and are elongated respectively in the scanning line direction are divided into multi divisions in the scanning line direction. Then, the respective bias lines 9 are connected respectively to the connection lines 10a to 10z which are elongated in the signal line direction (the direction indicated with an arrowed mark W in the figure).

Figure 21:
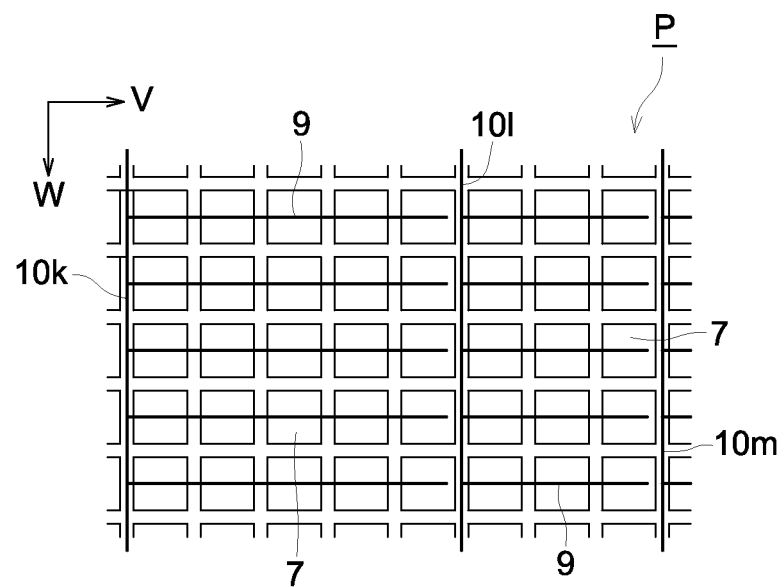
FIG. 21 is a plan view showing a structure in the case where respective bias lines elongated in the scanning line direction are divided into multi divisions in the scanning direction.

With this structure, the bias voltage Vbias is applied to the respective bias lines 9 via the respective connection lines 10a to 10z from the bias source 14 not illustrated in FIG. 21, so that the bias voltage Vbias can be applied to the respective radiation detecting elements 7 via the respective bias lines 9.

With this structure, as compared with the case where the bias lines 9 are arranged from one end side to the other end side in the detecting unit P as shown in FIG. 19, since the length of each of the bias lines 9 becomes shorter, the resistance value of each of the bias lines 9 becomes smaller. Accordingly, at the time of read-out processing of image data D from the respective radiation detecting elements 7, even if a lot of holes flow from the respective radiation detecting elements 7 irradiated with radiation to the respective bias lines 9, the degree of rise in the temporarily-rising bias voltage Vbias becomes small.

In this connection, even if the length of the respective bias lines 9 becomes short as mentioned above, there may be a case where the length of the respective connection lines 10a to 10z becomes long and the resistance value of the respective connection lines 10a to 10z becomes comparatively large. In such a case, for example, the respective connection lines 10a to 10z are separated at a middle portion in the signal line direction W (refer to FIG. 21) into upper and lower groups in the figure so that the length of the respective connection lines 10a to 10z can be made short.

However, since the number of the radiation detecting elements 7 connected to the single bias line 9 is originally small, the amount of holes which flow from the radiation detecting elements 7 irradiated with radiation to the respective connection lines 10a to 10z via the respective bias lines 9 becomes small. Accordingly, with the above structure, even if the resistance value of each of the connection lines 10a to 10z is large in some degree, the degree of rise in the temporarily-rising bias voltage Vbias becomes small.

Further, since the degree of rise in the temporarily-rising bias voltage Vbias becomes small, the bias voltage Vbias which rises once returns adequately to the original bias voltage Vbis (i.e., for example, −5 [V]) before the voltage applied to the scanning line 5 is switched from ON voltage to OFF voltage.

Therefore, cross talk in the scanning line direction can be prevented from occurring by the structures that the respective bias lines 9 which are connected to the respective radiation detecting elements 7 and are elongated respectively in the scanning line direction are divided into multi divisions in the scanning line direction V, and the bias voltage Vbias is applied to the respective bias lines 9 from the bias source 14.

With regard to the number of radiation detecting elements 7 to which the respective bias lines 9 are connected, as long as the number of elements ensures that the bias voltage Vbias which rises once returns to the original bias voltage Vbis before the voltage applied to the scanning line 5 is switched from ON voltage to OFF voltage, the appropriate number of elements may be determined in consideration of the structure of the base plate 4.

Moreover, the number of radiation detecting elements 7 to which the respective bias lines 9 are connected does not need to be the same number for each of the bias lines 9, and as long as the above-mentioned conditions are fulfilled, it may be possible to determine the proper number. For the sake of simplicity, FIG. 18 shows the case where the respective bias lines 9 are connected to five or three radiation detecting elements 7. However, as long as the bias voltage Vbias which rises once returns surely to the original bias voltage Vbis, the respective bias lines 9 are connected to the radiation detecting elements 7 with the number of the order of 10 or the order of 100.

Further, in FIG. 21, the input/output terminals (not shown) to which the respective connection lines 10a to 10z may be disposed upward direction or may be disposed downward direction. Furthermore, as mentioned above, in the case where the respective connection lines 10a to 10z are separated at a middle portion in the signal line direction into upper and lower groups, the input/output terminals are disposed upper and lower sides in the figure. In this way, the positions where the input/output terminals are disposed may be determined appropriately.

As mentioned above, according to the radiation image photographing apparatus 1 relating to this embodiment, the respective bias lines 9 arranged in the signal line direction are connected for each of the predetermined number of lines to either one of a plurality of connection lines 10a to 10z (refer to FIG. 18), or the respective bias lines 9 elongated in the scanning line direction are divided into multi divisions in the scanning line direction (refer to FIG. 21), and then the bias voltage Vbias is applied from the bias source 14 to the respective radiation detecting elements 7 via the respective connection lines 10a to 10z or the respective bias lines 9.

Therefore, the resistance value of the respective connection lines 10a to 10z (refer to FIG. 18) elongated in the scanning line direction or the respective bias lines 9 (refer to FIG. 21) becomes small, and further, an amount of holes which flow into the respective connection lines 10a to 10z (refer to FIG. 18) or the respective bias lines 9 (refer to FIG. 21) becomes small. As a result, the degree of rise in the temporarily-increasing bias voltage Vbias becomes small.

Then, since the bias voltage Vbias which rises once returns adequately to the original bias voltage Vbis before the voltage applied to the scanning line 5 is switched from ON voltage to OFF voltage, cross talk in the scanning line direction can be prevented adequately from occurring.

Consequently, for example, in the case where diseased parts of a patient are photographed with the radiation image photographing apparatus 1 used in radiation image photography for medical service, cross talk as shown in FIG. 22B and FIG. 24B tends to occur in the scanning line direction on the portion (i.e., so-called "direct pass-through portions") of the radiation image photographing apparatus 1 to where radiation is irradiated directly without passing through a body of a patient being an object to be photographed, or on the portion of the radiation image photographing apparatus 1 at where an amount of radiation having arrived to the radiation image photographing apparatus 1 is small due to absorption into the body or scattering by the body when radiation passes through the body of a patient.

However, in such a case, in the radiation image photographing apparatus 1 relating to the this embodiment, since the occurrence of cross talk in the scanning direction can be prevented adequately, the influence of cross talk does not appear on a radiation image produced based on the read-out image data so that the radiation image can be observed easily. Accordingly, it becomes possible to prevent adequately the occurrence of the inconvenience that the portions of cross talk are erroneously observed as diseased parts, or diseased parts are overlooked due to difficulty in observation for the diseased parts under the influence of cross talk.

Incidentally, the resistance value per a unit length of the respective connection lines 10a to 10z or the respective bias lines 9 may change depending on the material and structure (in particular, cross sectional area) of the respective connection lines 10a to 10z (refer to FIG. 18) or the respective bias lines 9 (refer to FIG. 21). Further, depending on various factors, such as the performances of the radiation detecting elements 7, the voltage value of the voltage applied to the respective TFTs 8 as ON voltage, an amount of holes which flow from the respective radiation detecting elements 7 to the respective bias lines 9 may change, or an amount of holes which flow in the respective connection lines 10a to 10z may change. Further, there may be restrictions due to the structure of the base plate 4.

Therefore, with regard to the number of the respective bias lines 9 connected to the respective connection lines 10a to 10z (refer to FIG. 18), the number of the radiation detecting elements 7 to which the respective bias lines 9 are connected (refer to FIG. 21), and the like, the number of lines and the number of elements are appropriately determined in accordance with the structure of the radiation image photographing apparatus 1 as the actual apparatus as mentioned above.

What is claimed is:

1. A radiation image photographing apparatus, comprising:
   a detecting section made of a single glass substrate and including a plurality of scanning lines and a plurality of signal lines which are arranged to cross each other, and a plurality of radiation detecting elements which are arranged in a two dimensional form in respective regions divided by the plurality of scanning lines and the plurality of signal lines;
   a bias source which applies a bias voltage onto the radiation detecting elements via bias lines;
   a scan driving section to switch over between ON voltage and OFF voltage on the scanning lines so as to switch over between ON voltage and OFF voltage to be applied to respective switch sections of the radiation detecting elements;
   a read-out circuit to read out image data by converting charge discharged from the radiation detecting elements to the signal lines via the switch sections into the image data; and
   a control section to control at least the scan driving section and the read-out circuit so as to conduct read-out processing of the image data;
   wherein the bias lines are connected to the radiation detecting elements arranged in the detecting section with a ratio of one bias line to the radiation detecting elements arranged on one column in an extension direction of the signal line, the bias lines include 1000 or more bias lines, and a predetermined number of bias lines being less than 1000 is connected to one of a plurality of connection lines,
   wherein the bias voltage is applied from the bias source to the connection lines so that the bias voltage is applied to the radiation detecting elements via the bias lines connected to the connection lines, and
   wherein the predetermined number of bias lines is set to a number of bias lines which ensures that a temporarily-rising bias voltage returns to an original bias voltage before an ON voltage applied to the scanning line is switched to an OFF voltage.

2. The radiation image photographing apparatus described in claim 1, wherein the bias lines are separated into a plurality of groups, and each of the plurality of groups includes a predetermined number of bias lines and is connected to either one of a plurality of connection lines.

3. The radiation image photographing apparatus described in claim 1, wherein the radiation detecting element is a photodiode element including a first electrode to output electrons and a second electrode to output holes.

4. The radiation image photographing apparatus described in claim 3, wherein the first electrode is connected to the switch section and the second electrode is connected to the bias line.

5. The radiation image photographing apparatus described in claim 4, wherein the switch section is a transistor element including a gate electrode, a source electrode, and a drain electrode.

6. The radiation image photographing apparatus described in claim 5, wherein the gate electrode is connected to the scanning line, the source electrode is connected to the first electrode of the photodiode element, and the drain electrode is connected to the signal line.

* * * * *